(12) United States Patent
Hasegawa

(10) Patent No.: US 11,496,869 B2
(45) Date of Patent: Nov. 8, 2022

(54) SERVER, COMMUNICATION SYSTEM, COMMUNICATION METHOD AND PROGRAM

(71) Applicant: NEC CORPORATION, Tokyo (JP)

(72) Inventor: Yohei Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 112 days.

(21) Appl. No.: 16/975,622

(22) PCT Filed: Mar. 28, 2019

(86) PCT No.: PCT/JP2019/013644
§ 371 (c)(1),
(2) Date: Aug. 25, 2020

(87) PCT Pub. No.: WO2019/189597
PCT Pub. Date: Oct. 3, 2019

(65) Prior Publication Data
US 2021/0006952 A1   Jan. 7, 2021

(30) Foreign Application Priority Data
Mar. 29, 2018   (JP) .............................. JP2018-066024

(51) Int. Cl.
*H04W 72/04* (2009.01)
*H04W 4/38* (2018.01)
(Continued)

(52) U.S. Cl.
CPC .............. *H04W 4/38* (2018.02); *H04L 1/1812* (2013.01); *H04W 52/34* (2013.01); *H04W 72/0446* (2013.01); *H04W 88/16* (2013.01)

(58) Field of Classification Search
CPC ... H04W 4/38; H04W 52/34; H04W 72/0446; H04W 88/16; H04W 52/48;
(Continued)

(56) References Cited

U.S. PATENT DOCUMENTS 7,120,852 B2   10/2006   Terry et al.
10,128,925 B2   11/2018   Chun et al.
(Continued)

FOREIGN PATENT DOCUMENTS

JP   2007-525092 A   8/2007
JP   3961351 B2   8/2007
(Continued)

OTHER PUBLICATIONS

International Search Report for PCT/JP2019/013644 dated May 7, 2019 (PCT/ISA/210).
(Continued)

*Primary Examiner* — Gregory B Sefcheck
*Assistant Examiner* — Joshua Smith
(74) *Attorney, Agent, or Firm* — Sughrue Mion, PLLC

(57) ABSTRACT

A sever transmits an acknowledgement in response to data transmission from first and second terminals, respectively, among a plurality of terminals. The server controls the first and second terminals so that the first and second terminals open a reception slot at substantially the same timing. The server transmits a collective acknowledgement shared by the first and second terminals during both of the first and second terminals open the reception slot.

10 Claims, 20 Drawing Sheets

COLLECTIVE ACK PACKET

| IP HEADER | COLLECTIVE ACK ID | ACK DATA ADDRESSED TO TERMINAL 10-1 | ACK DATA ADDRESSED TO TERMINAL 10-2 | ACK DATA ADDRESSED TO TERMINAL 10-3 |

(51) Int. Cl.
*H04L 1/18* (2006.01)
*H04W 52/34* (2009.01)
*H04W 88/16* (2009.01)

(58) Field of Classification Search
CPC . H04W 52/0241; H04W 68/00; H04W 76/27; H04W 76/28; H04L 1/1812; H04L 2001/0093; H04L 2001/0097; H04L 1/1671; Y02D 30/70
See application file for complete search history.

(56) References Cited

U.S. PATENT DOCUMENTS

| | | | |
|---|---|---|---|
| 10,149,284 B2 | 12/2018 | Tian et al. | |
| 2005/0015703 A1 | 1/2005 | Terry et al. | |
| 2009/0238160 A1* | 9/2009 | Bhatti | H04L 1/1887 370/338 |
| 2010/0246375 A1* | 9/2010 | Orlik | H04L 5/0007 370/436 |
| 2014/0079016 A1 | 3/2014 | Dai et al. | |
| 2016/0234831 A1 | 8/2016 | Tian et al. | |
| 2017/0006612 A1 | 1/2017 | Nabetani et al. | |
| 2017/0195086 A1 | 7/2017 | Ghosh | |
| 2017/0272138 A1 | 9/2017 | Chun et al. | |
| 2017/0303069 A1 | 10/2017 | Mamaloukas et al. | |
| 2017/0303096 A1* | 10/2017 | Masuda | H04W 28/18 |
| 2017/0303292 A1* | 10/2017 | Ahn | H04W 72/12 |
| 2017/0373804 A1 | 12/2017 | Han et al. | |
| 2020/0187152 A1* | 6/2020 | Karampatsis | H04W 68/00 |

FOREIGN PATENT DOCUMENTS

| | | |
|---|---|---|
| JP | 5986244 B2 | 9/2016 |
| JP | 2017-055398 A | 3/2017 |
| JP | 2017-212503 A | 11/2017 |
| JP | 2018-506231 A | 3/2018 |
| WO | 2015/166959 A1 | 11/2015 |

OTHER PUBLICATIONS

Japanese Office Communication for JP Application No. 2020-510991 dated Mar. 1, 2022 with English Translation.

* cited by examiner

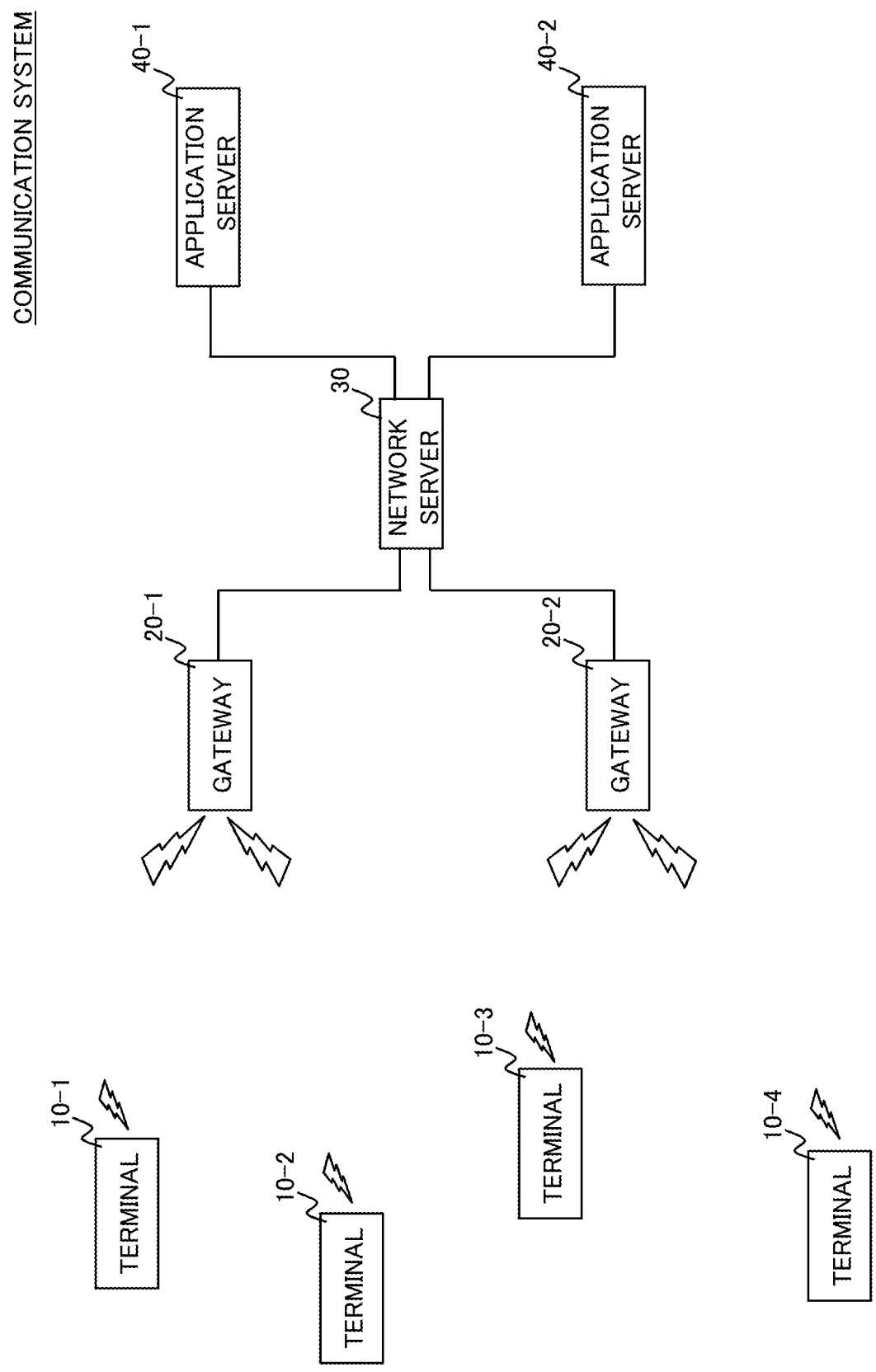

FIG. 6A

| IP HEADER | COLLECTIVE ACK ID | ACK DATA ADDRESSED TO TERMINAL 10-1 | ACK DATA ADDRESSED TO TERMINAL 10-2 | ACK DATA ADDRESSED TO TERMINAL 10-3 |
|---|---|---|---|---|

COLLECTIVE ACK PACKET

FIG. 6B

| COLLECTIVE ACK ID | ACK DATA ADDRESSED TO TERMINAL 10-1 | ACK DATA ADDRESSED TO TERMINAL 10-2 | ACK DATA ADDRESSED TO TERMINAL 10-3 |
|---|---|---|---|

COLLECTIVE ACK FRAME

FIG. 11

| TERMINAL ID | PACKET NUMBER | COLLECTIVE ID |
|---|---|---|
| $\underbrace{00000001}_{H_1}$ | $\underbrace{00101101}_{P_1}$ | $\underbrace{00}_{H_1}\underbrace{101101}_{P_1}$ |
| $\underbrace{00100101}_{H_2}$ | $\underbrace{00010011}_{P_2}$ | $\underbrace{10}_{H_2}\underbrace{110011}_{P_2}$ |
| ... | ... | ... |

FIG. 16

| GROUP | TERMINAL | | | |
|---|---|---|---|---|
| | 10-1 | 10-2 | 10-3 | 10-4 |
| G1 | × | × | ○ | ○ |
| G2 | × | ○ | × | ○ |
| G3 | ○ | × | × | ○ |
| G4 | × | ○ | ○ | × |
| G5 | ○ | × | ○ | × |
| G6 | ○ | ○ | × | × |
| G7 | ○ | ○ | ○ | × |
| G8 | ○ | × | × | ○ |
| G9 | ○ | ○ | ○ | ○ |
| G10 | × | ○ | ○ | ○ |

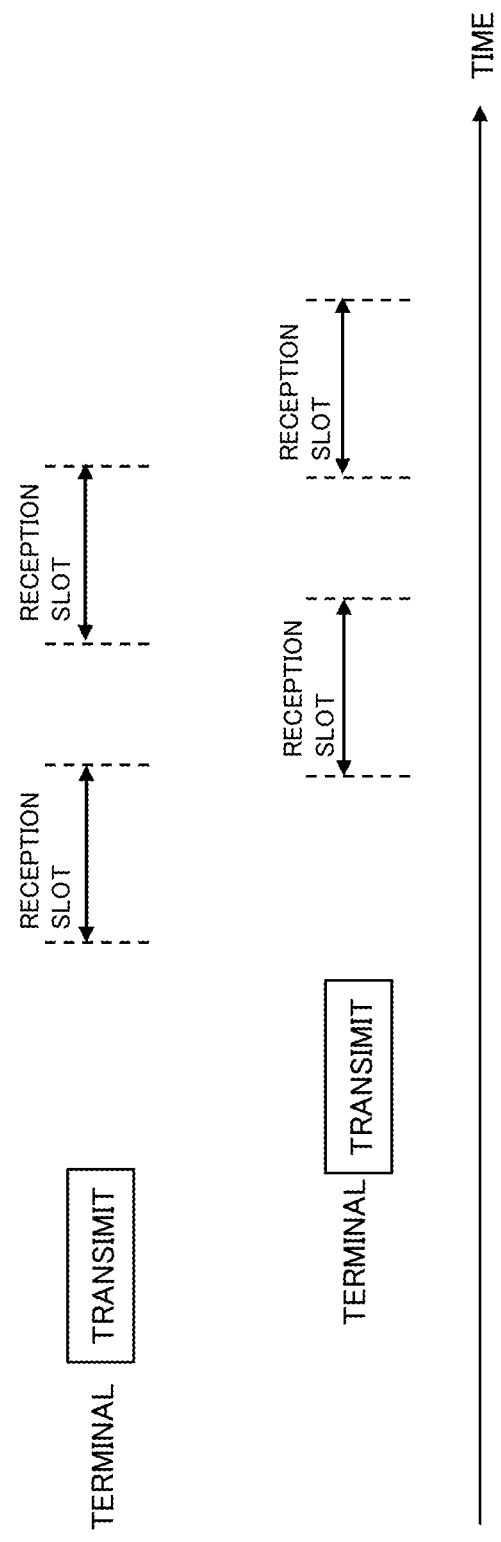

SERVER, COMMUNICATION SYSTEM, COMMUNICATION METHOD AND PROGRAM

CROSS-REFERENCE TO RELATED APPLICATION

This application is a National Stage of International Application No. PCT/JP2019/013644 filed Mar. 28, 2019, claiming priority based on priority of JP Patent Application No. 2018-066024 (filed on Mar. 29, 2018). The entire contents thereof are incorporated by reference into the present application.

FIELD

The present invention relates to a server, communication system, communication method and program.

BACKGROUND

Along with development in recent network technology and information processing technology, there are attempts to provide efficient service operation in a variety of industries. Concretely, a sensor, such as an electric power meter, and a sensor for measuring a temperature etc. are provided with a communication function, and an increased number of systems are provided, in which information is collected from these devices. Particularly, developed are smart meters in which water meter, gas meter etc. are provided with communication function, resulting in drastic improvement in efficiency of acquiring measured data.

Under such situation, there are discussions to further expand the use of the smart meter etc. For example, an attempt has been underway to use radio communication for information collection by the smart meter etc.

Particularly, data communication utilizing LPWA (Low Power Wide Area) radio communication has been developed, which, without license, allows radio wave to reach a place apart at a distance of several kilo meters. Herein, the standard of the Low Power Wide Area radio communication includes standards of LORA (LoRaWAN), Wi-SUN (Wireless Smart Utility Network) etc. The Low Power Wide Area radio communication has an excellent communication sensitivity while realizing radio wave distribution in a broad area using mainly 900 MHz band, thus power for transmission may be suppressed at a low level, resulting in operation by low power consumption.

Patent Literature 1 discloses a communication system in which upstream acknowledgements are collected as a response to downstream multicast, broadcast. In addition, Patent Literature 2 discloses a radio communication system in which packets are collected. Patent Literature 3 discloses a radio communication system in which channel aggregation is executed. Patent Literature 4 discloses a technology in which a base station returns an acknowledgement to a plurality of terminals so that a plurality of acknowledgements is accommodated in one frame upon transmission.

Patent Literature 1: Japanese patent No. 3961351B
Patent Literature 2: Japanese patent publication Tokuhyo 2007-525092A
Patent Literature 3: Japanese patent No. 5986244B
Patent Literature 4: Japanese patent publication Tokuhyo 2018-506231A

SUMMARY

As stated above, although utilization of the Low Power Wide Area radio communication has been developed, this radio communication has a severe restriction in frequency bands to be used, which realizes a communication speed merely ranging in an extent from several hundred bps (bit per second) to several kilo bps.

Furthermore, laws restrict the way of utilizing radio wave under the Low Power Wide Area radio communication. For example, it is requested in Japan that, in a case of less than 5 ms of carrier sense time, total sum of transmission time per one hour must be 360 seconds or less. Moreover, in foreign countries, there is an example in which more severe restriction is applied as compared to the above restriction.

In order to comply with said restriction, various countermeasures are applied to a gateway (radio gateway) connected with the smart meter etc. by radio communication. For example, a countermeasure is applied to a gateway accommodating a plurality of smart meters, such that the gateway collects data from these smart meters, and suspends transmission of a response (ACK; ACKnowledgement) responsive to data transmitted from the smart meters.

However, there is a limitation in such data transmission control. In some cases, there is a possibility of loss of ACK packet (ACK frame) to be transmitted to the smart meters etc. As described in detail below, a terminal applicable to the Low Power Wide Area radio communication (merely referred to as "terminal" hereinafter) shifts to an idle mode after transmission of a data frame to suppress power consumption. The terminal shifts to a reception waiting mode (idle reception mode) after elapse of a predetermined time period so that it may receive ACK frame. If it could not receive the ACK frame within the predetermined time period, the terminal shifts to the idle mode again. After that, the terminal shifts to the reception waiting mode again after elapse of a predetermined time period so that it may receive ACK frame.

As described above, the terminal opens a reception slot twice so that ACK frame is received by either one of the reception slots. If the terminal cannot receive the ACK frame by either one of the two reception slots, the terminal executes a process for retransmission of data.

Herein, there is a case where one gateway is in radio communication with a plurality of terminals. FIG. 20 shows an overview of data transmission by two terminals under LoRaWAN ClassA. As illustrated in FIG. 20, when two terminals respectively execute data transmission, each terminal opens a reception slot twice respectively. Under such situation, a carrier sense controls radio transmissions between the two terminals and the gateway so as to avoid their collision, and thus transmission times are controlled to have no mutual overlap.

That is, the gateway transmits the ACK frames during each terminal opens the reception slot in such a manner that no collision occurs with an ACK frame destined to the other terminal. Accordingly, there is a possibility that the gateway may not transmit the ACK frame during each terminal opens the reception slot, depending on the number of the terminals and communication conditions.

That is, under a situation where one gateway is in communication with a plurality of terminals, there is a case where the gateway is not capable of transmitting the ACK frame within a defined time period. In such case, the gateway accumulates (stores) ACK frames which have not been transmitted in a buffer installed therein. However, if the ACK frames (in a waiting mode of transmission) accumulated at a level that the gateway cannot store any more, data which should be transmitted to the smart meter will be lost.

Herein, such problem cannot be solved by applying Patent Literature 1. For example, although Patent Literature 1 discloses collection of upstream acknowledgements (ACK), the Low Power Wide Area radio communication has a problem in downstream data transmission (ACK transmission) in which waiting reception time is restricted.

It is a main purpose of the present invention to provide a server, communication system, communication method and program contributing to efficient transmission of ACK frame under Low Power Wide Area radio communication.

According to a first aspect of the present invention or the present disclosure, there is provided a sever configured to: transmit an acknowledgement in response to data transmission from first and second terminals, respectively, among a plurality of terminals; control the first and second terminals so that the first and second terminals open a reception slot at substantially the same timing; and transmit a collective acknowledgement shared by the first and second terminals during both of the first and second terminals open the reception slot.

According to a second aspect of the present invention or the present disclosure, there is provided a communication system comprising a plurality of terminals and a server, wherein the server is configured to: transmit an acknowledgement in response to data transmission from first and second terminals, respectively, among a plurality of terminals, control the first and second terminals so that the first and second terminals open a reception slot at substantially the same timing; and transmit a collective acknowledgement shared by the first and second terminals during both of the first and second terminals open the reception slot.

According to a third aspect of the present invention or the present disclosure, there is provided a communication method, wherein a server is configured to execute the following processes:
transmitting an acknowledgement in response to data transmission from first and second terminals, respectively, among a plurality of terminals, controlling the first and second terminals so that the first and second terminals open a reception slot at substantially the same timing; and transmitting a collective acknowledgement shared by the first and second terminals while both of the first and second terminals open the reception slot.

According to a fourth aspect of the present invention or the present disclosure, there is provided
a program which causes a computer installed in a server to execute the following processes:
transmitting an acknowledgement in response to data transmission from first and second terminals, respectively, among a plurality of terminals, controlling the first and second terminals so that the first and second terminals open a reception slot at substantially the same timing; and transmitting a collective acknowledgement shared by the first and second terminals during both of the first and second terminals open the reception slot.

Herein, the program may be stored in a storage medium readable by a computer. The storage medium may be non-transient one, such as a semiconductor memory, a hard disk, a magnetic recording medium, an optical recording medium etc. The present invention may be realized as a computer program product.

According to each aspect of the present invention or the present disclosure, there are provided a server, communication system, communication method and program contributing to efficient transmission of ACK frame under Low Power Wide Area radio communication.

BRIEF DESCRIPTION OF THE DRAWINGS

FIG. 2 is a diagram showing one example of an overview configuration of a communication system of a first exemplary embodiment.

FIGS. 6A-6B are explanatory views of actions by a terminal and a network server.

FIG. 11 is a diagram showing a relationship between a packet number and a collective ID.

FIG. 16 is an explanatory view of grouping of terminals of the second exemplary embodiment.

FIG. 20 is a diagram showing an overview of data transmission by two terminals under LoRaWAN ClassA.

PREFERRED MODES

First, an overview of one exemplary embodiment will be explained. Note that, symbols in the following description are expediently attached to each element as an explanatory aid for understanding, but not for limitation of the present invention to an illustrated configuration. In addition, a connection line between blocks in each figure indicates both of bi-direction and single direction. One way arrow schematically shows main signal (data) flow, but not excluding bi-direction. Furthermore, in a circuit diagram, a block diagram, an inner construction diagram, a connection diagram etc. of the present application, an input port and an output port are respectively provided on an input end and an output end of each connection line, even though they are omitted. The same is applied to input/output interfaces.

Figure 1:
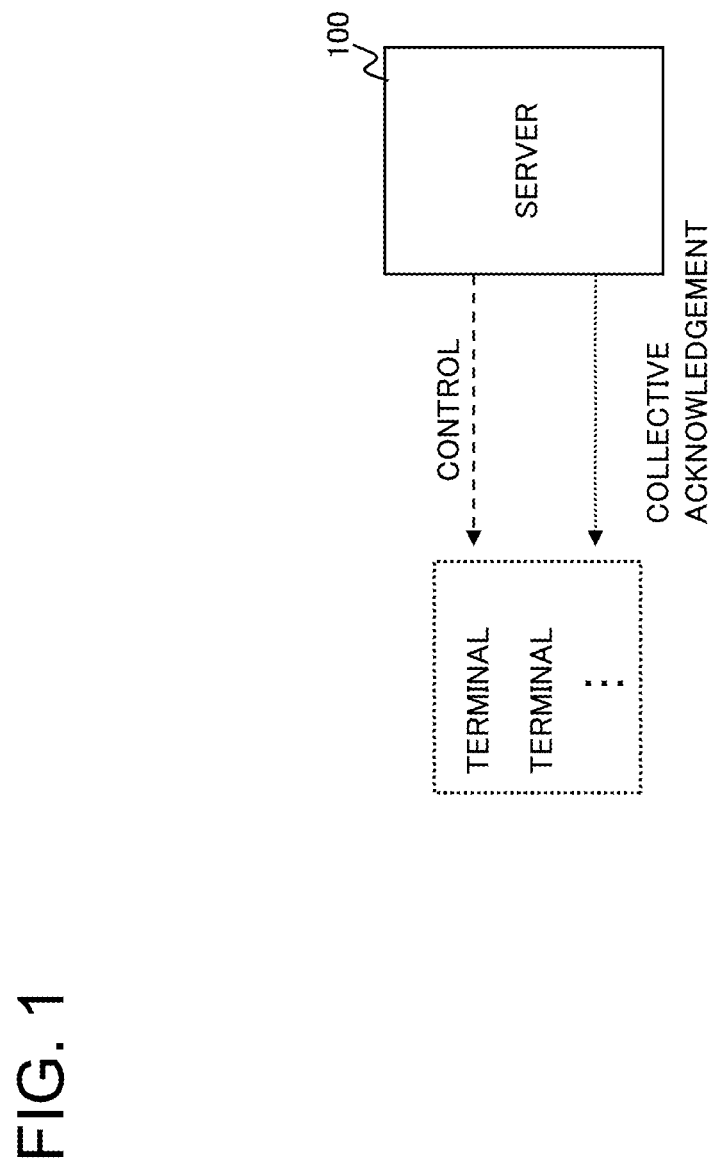
FIG. 1 is an explanatory view of an overview of one exemplary embodiment.

A server 100 of one exemplary embodiment (see FIG. 1) transmits an acknowledgement in response to data transmission from first and second terminals, respectively, among a plurality of terminals. The server 100 controls the first and second terminals so that the first and second terminals open a reception slot at substantially the same timing. The server 100 transmits a collective acknowledgement shared by the first and second terminals during both of the first and second terminals open the reception slot.

When the server 100 returns an acknowledgement indicating reception of data from the first and second terminals, the server 100 adjusts the timing of shift to a reception waiting mode (idle reception mode) by terminals 10 to be substantially the same timing. Furthermore, the server 100 collects the acknowledgements destined to the first and second terminals and transmits a collected acknowledgement. Accordingly, the server 100 collects the acknowledgements to be transmitted to a plurality of terminals and notifies each terminal by one transmission of the collected acknowledgement. As a result, the total volume of frames to be transmitted from the server 100 to the terminal is reduced, thus transmission of ACK frame may be efficiently executed under a radio communication, particularly, Low Power Wide Area radio communication.

Concrete exemplary embodiments will be explained below in detail referring to drawings. Herein, the same reference numerals are attached to the same component in each exemplary embodiment, and explanation thereof is omitted.

FIRST EXEMPLARY EMBODIMENT

A first exemplary embodiment will be explained in detail referring to drawings.

FIG. 2 is a diagram showing one example of an overview configuration of a communication system of a first exemplary embodiment. When see FIG. 2, the communication system of the first exemplary embodiment includes terminals 10-1 to 10-4, gateways 20-1 and 20-2, a network server 30, and application servers 40-1 and 40-2.

In the following explanation, in a case where there is no particular reason for discriminating the terminals 10-1 to 10-4, they will be expressed as a mere "terminal 10". Also, the other constructions will be similarly expressed with numerical values at left side of a hyphen as a representative item of such constructions.

The terminal 10 collects (or accumulates) data from sensors and transmits a data frame including a terminal ID (Identifier) for identification of own apparatus and the sensor data to the gateway 20.

The gateway 20 providing the terminal 10 with radio connection receives the data frame transmitted by the terminal 10 and transmits data packet including the data frame to the network server 30.

The network server 30 receives the data packet transmitted by the gateway 20. The network server 30 refers to the sensor data etc. stored in the data packet and transmits the data packet to an application server assigned to (or associated with) the terminal 10 which has transmitted the sensor data.

The application server 40 receives the data packet transmitted from the network server 30 and realizes IoT (Internet of Things) service. The data collected by the application server 40 is presumed to be data, for example, weather observation data, traffic congestion state, consumption state of electric power/gas/water or the like.

When the application server 40 can normally receive the data packet, the application server 40 generates ACK packet including a terminal ID of the terminal 10 which has transmitted the sensor data and ACK data for the terminal 10, and transmit it to the network server 30.

The network server 30 receives the ACK packet and transfers the ACK packet to the gateway 20 which is in communication with the terminal 10 which has transmitted the data packet.

The gateway 20 receives the ACK packet and transmits ACK frame as a response to the data transmission from the terminal 10.

Herein, the system configuration illustrated in FIG. 2 is a mere example, but not intended to limit the configuration of the communication system. For example, the gateway 20 or the application server 40 may be single or triple or more. Or a plurality of gateways 20 may receive data from one terminal 10. Furthermore, the gateway 20 and the network server 30 may be arranged in the same domain, or may be connected via broad network, such as internet or the like.

In the following explanation, a case will be explained, in which the application server 40 generates an acknowledgement (ACK) as a response to data transmission from the terminal 10 and the network server 30 transmits the ACK packet to the gateway. However, the network server 30 may be configured to generate the acknowledgement in a response to data transmission from the terminal 10, such that the network server 30 may confirm the contents of the data packet and transmit it to the application server 40. That is, if the terminal 10 is regarded as a transmission terminal (transmission node) for sensor data etc., the network server 30 would be regarded as a reception terminal (reception node, receiving server).

First, actions relating to frame communication (transmission/reception) by the terminal 10 will be explained referring to drawings. The terminal 10 collects sensor data and periodically transmits a data frame including the sensor data to a gateway 20.

Figure 3A:
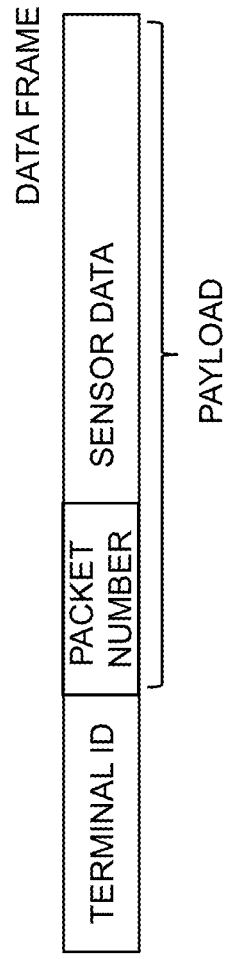
FIGS. 3A-3B are diagrams showing one example of a frame communicated (transmitted/received) by a terminal of the first exemplary embodiment.

For example, the terminal 10 transmits a data frame having such a configuration as illustrated in FIG. 3A. As illustrated in FIG. 3A, the data frame transmitted by the terminal 10 includes terminal ID assigned to the terminal 10, and payload storing packet number and sensor data.

Figure 4A:
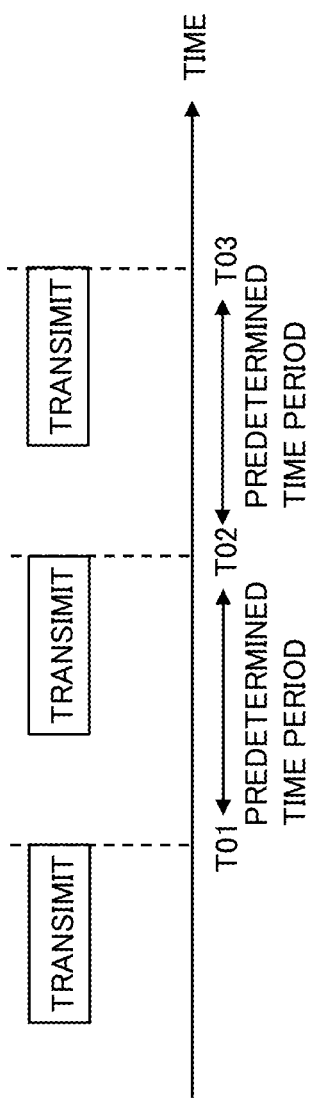
FIGS. 4A-4B are explanatory views of a frame communication action by a terminal.

The terminal 10 transmits a data frame as illustrated in FIG. 3A to the gateway 20 at a predetermined time interval (for example, every 10 minutes) (see FIG. 4A).

Figure 4B:
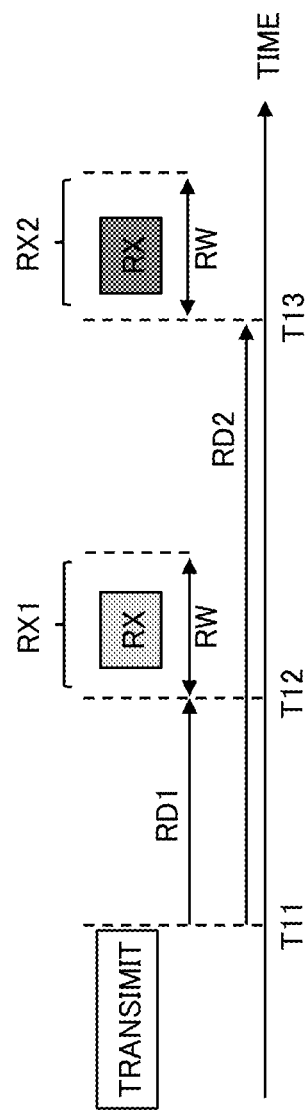

The terminal 10 shifts to an idle mode (sleep mode) after transmission of the data frame. Subsequently, the terminal 10 returns from the idle mode after elapse of a predetermined time period, and shifts to a mode in which it may receive ACK frame from the gateway 20 (reception waiting mode/idle reception mode). Concretely, as illustrated in FIG. 4B, the terminal 10 shifts to the idle mode from a transmission completion time T11 of the data frame until elapse of a predetermined time period (RD1; Receive Delay 1), and shifts to the reception mode at time T12.

The terminal 10 may receive ACK frame from the gateway 20 during a predetermined time period (RW; Receive Window) after returning to the reception waiting mode.

In a case where the terminal 10 could receive the ACK frame (ACK data from the application server 40) within such time period, the terminal 10 determines that the preceding (previously transmitted) data frame which had been transmitted by itself has been normally received by the application server 40 and completes a frame transmission process.

On the other hand, in a case where the terminal 10 could not receive the acknowledgement within such time period, the terminal 10 shifts to the idle mode again. The terminal 10 stays in the idle mode from time T11 of transmitting the preceding data frame until elapse of a predetermined period (RD2; Receive Delay 2), and then returns to the reception mode at time T13 (see FIG. 4B). The terminal 10 can receive the ACK frame from the gateway 20 during a predetermined period (RW; Receive Window) after returning to normal operation mode.

Herein, the ACK frame transmitted by the gateway 20 to the terminal 10 is referred to as "RX" in drawings including FIGS. 4A-4B.

In a case where the terminal 10 could receive the ACK frame, the terminal 10 determines that the preceding frame has been normally received by the application server 40 and completes the frame transmission process. On the other hand, in a case where the terminal 10 could not receive the ACK frame within such time period, the terminal 10 executes retransmission process of the data frame and the like.

As described above, the terminal 10 prepares two reception slots as a response to one transmission slot (one data transmission) so as to receive the ACK frame from the gateway 20.

Figure 3B:
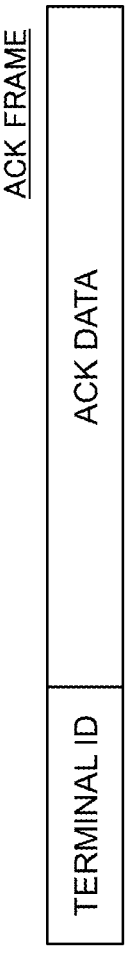

Herein, the terminal 10 receives the ACK frame as illustrated in FIG. 3B. The terminal 10 determines whether or not the data transmission from own apparatus has been normally processed based on the terminal ID or ACK data in the ACK frame.

In addition, the network server 30 may include an instruction, data etc. directed to the terminal 10 in the ACK packet obtained from the application server 40. Concretely, the network server 30 may add instruction content etc. to the ACK data illustrated in FIG. 3B.

In the following explanation, the predetermined period RD1 from transmission of the data frame until opening of the first reception slot by the terminal 10 is referred to as "first return period" or "RD1" only. Similarly, the predetermined period RD2 from transmission of the data frame until opening of the second reception slot is referred as "second return period" or "RD2" simply. In addition, the first opening of the reception slot (first reception slot) is referred to as RX1 and the second opening of the reception slot (second reception slot) is referred to as RX2.

Next, an overview of communication system of the first exemplary embodiment will be explained referring to drawings.

The network server 30 provides designation for the first return period and the second return period to the terminal 10 which has transmitted the data frame and instructs it to open the reception slots after elapse of the designated time periods. The configuration of the data frame to be transmitted to the gateway 20 by the terminal 10 and the transmission interval are explained as above referring to FIGS. 3A-3B and FIGS. 4A-4B.

Figure 5:
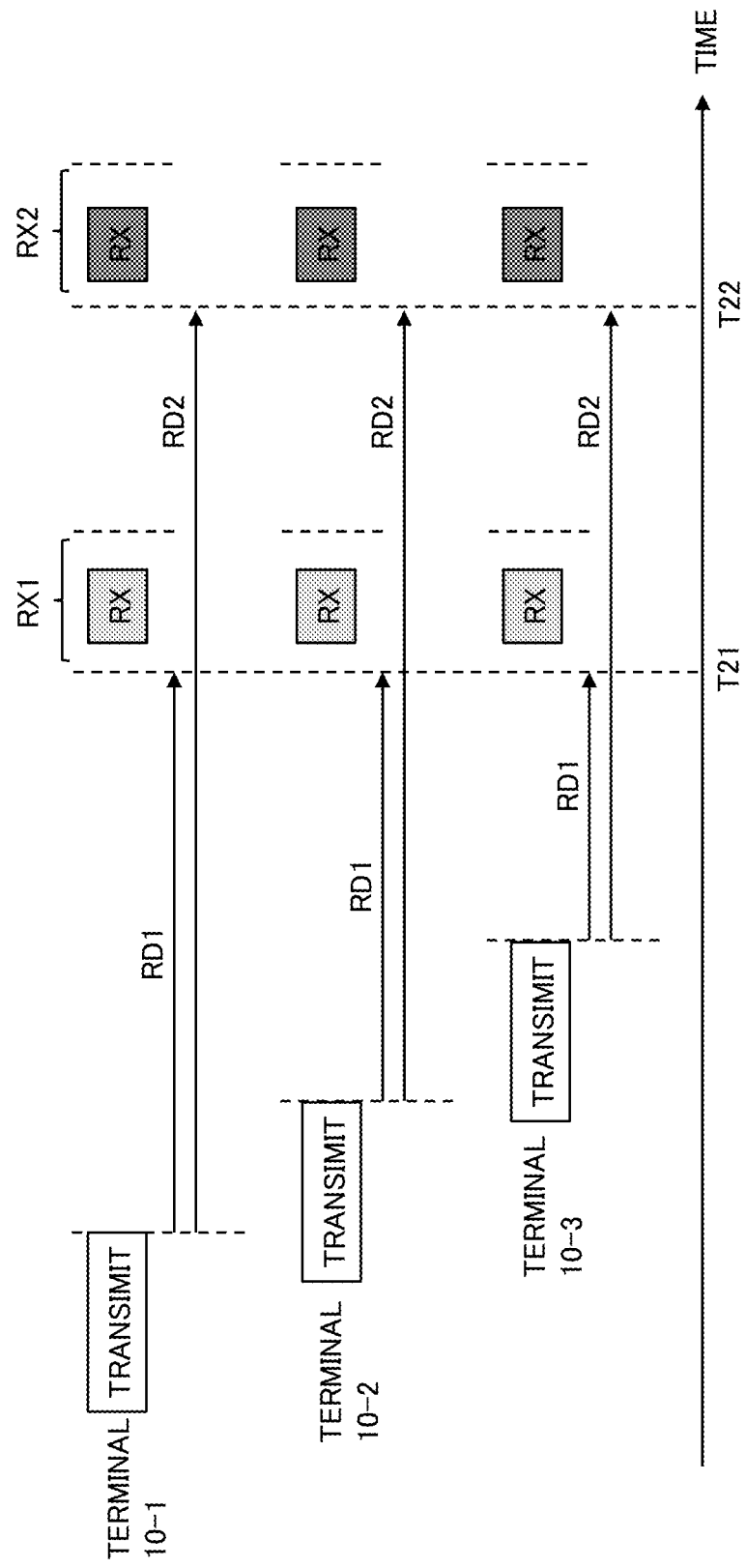
FIG. 5 is an explanatory view of actions by a terminal and a network server.

The terminal 10 prepares for ACK frame transmission from the gateway 20 according to two return periods (RD1, RD2) instructed by the network server 30. Concretely, since the first return period (RD1) and the second return period (RD2) indicated in FIG. 5 are instructed by the network server 30, the terminal 10 returns from idle mode and receives the ACK frame according to the instruction.

The network server 30 determines two return periods (RD1, RD2) of each terminal 10 so that a plurality of terminals 10 open a reception slot substantially at the same time. For example, referring to FIG. 5, the terminals 10-1 to 10-3 respectively transmit data frame at different timings. In such case, each terminal 10 would open a reception slot after elapse of a predetermined return period, unless the network server 30 provides any instruction for the return period to the terminal 10.

The terminal 10 having received instruction from the network server 30 opens reception slots in accordance with the instruction from the network server 30. The network server 30 instructs each terminal 10 with two return periods (RD1, RD2) so as to open reception slots at the same timing. As a result, as illustrated in FIG. 5, the reception slots opened by the plurality of terminals 10 are synchronized.

The network server 30 generates a collective ACK packet in which ACK packets transmitted from the application server 40 to the plurality of terminals 10 connected with the gateway 20 are collected. The collective ACK packet includes ACK data for each terminal 10 and a collective ACK ID in place of "terminal ID". For example, in an example indicated in FIG. 5, a collective ACK packet illustrated in FIG. 6A is generated.

The network server 30 transmits the collective ACK packet to a gateway 20 (a gateway 20 connected with a plurality of terminals 10). The gateway 20 deletes an IP (Internet protocol) header from the collective ACK packet and transmits a collective ACK frame to the terminals 10. More concretely, the gateway 20 transmits the collective ACK frame as a response to data transmission from the plurality of terminals 10 to the terminals 10 (see FIG. 6B) within simultaneously opened reception slots.

Each terminal 10 receives the collective ACK frame and determines whether or not the collective ACK frame includes an acknowledgement (ACK) addressed (destined) to own apparatus. In a case of relating the acknowledgement (ACK) addressed to own apparatus, each terminal 10 determines that the preceding data frame has been normally received. In a case of not relating acknowledgement addressed to own apparatus, each terminal 10 discards the obtained collective ACK frame.

Herein, the gateway 20 does not transmit the collective ACK packet (collective ACK frame) to a terminal 10 to which no instruction of the return periods RD1, RD2 has been provided, and transmits a normal ACK frame as illustrated in FIG. 3B. At that time, the gateway 20 may notify the terminal 10 of the return periods as aforementioned.

The collective ACK frame, collective ACK ID, etc. will be explained in detail below.

Accordingly, the communication system of the first exemplary embodiment comprises a plurality of terminals 10 and a network server 30, in which the network server 30 transmits an acknowledgement as a response to data transmission from first and second terminals, respectively, among the plurality of terminals 10. At that time, the network server 30 controls the first and second terminals so that the first and second terminals open reception slots at substantially the same timing. Further, the network server 30 transmits a collective acknowledgement (collective ACK packet) shared by the first and second terminals during both of the first and second terminals open the reception slots.

Next, each apparatus involved in the communication system will be explained in detail.

Figure 7:
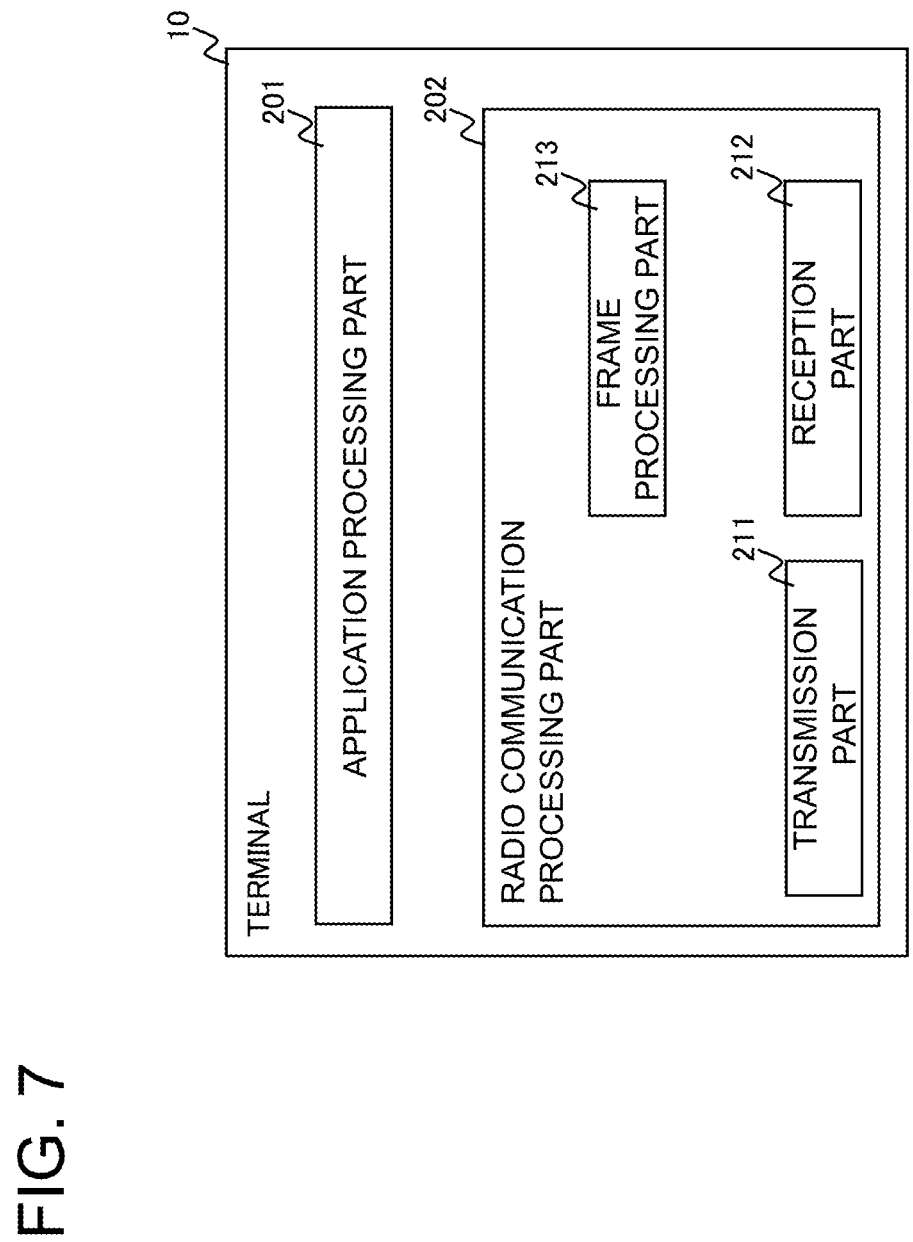
FIG. 7 is a diagram showing one example of a processing configuration of a terminal of the first exemplary embodiment.

FIG. 7 is a diagram showing one example of a processing configuration (processing module) of a terminal 10. Referring to FIG. 7, the terminal 10 is configured by comprising an application processing part 201 and a radio communication processing part 202.

The application processing part 201 transfers data obtained by a sensor etc., installed in the terminal 10 (or connected to the terminal 10) to the radio communication processing part 202.

The radio communication processing part 202 stores the sensor data and transmits it to the gateway 20. In addition, the radio communication processing part 202 receives ACK packet from the network server 30 via the gateway 20 as a response to data transmission.

The radio communication processing part 202 is configured by comprising a transmission part 211, a reception part 212 and a frame processing part 213.

The transmission part 211 generates a data frame to be transmitted to gateway 20 based on the sensor data obtained from the application processing part 201, and transmits it thereto. At that time, the transmission part 211 generates a frame including terminal ID and packet number as illustrated in FIG. 3A. In the first exemplary embodiment, both of the terminal ID and the packet number are indicated by 8 bits in size.

The terminal 10 shifts to an idle mode after transmission of the data frame until elapse of predetermined periods (RD1, RD2). After elapse of these periods, the terminal 10 shifts to a reception waiting mode for ACK frame (opens a reception slot).

The reception part 212 receives ACK frame transmitted from the gateway 20 under the reception waiting mode. The reception part 212 transfers the received ACK frame to the frame processing part 213.

The frame processing part 213 confirms the received ACK frame and determines whether or not the ACK frame is addressed to own apparatus. Herein, in a case that the obtained ACK frame is a normal frame (a frame including no collective ACK ID), the frame processing part 213 compares a terminal ID included in the obtained ACK frame with own terminal ID for executing the determination stated above.

On the other hand, in a case that the obtained ACK frame is a collective ACK frame, the frame processing part 213 executes a predetermined logical operation (calculation) to the collective ACK ID so as to execute the determination stated above. Herein, the predetermined logical operation (calculation) by the frame processing part 213 will be explained below together with generation of collective ACK ID, since it is related to generation of collective ACK ID.

The frame processing part 213 transfers the obtained ACK frame to the application processing part 201 if the obtained ACK frame is addressed to own apparatus.

In a case where the obtained ACK frame includes an instruction from the network server 30 (an instruction regarding first and second return periods), the reception part 212 stores the instructed return periods. The reception part 212 opens reception slots according to the obtained return periods so as to correspond to the data frame transmission which would occur in the future).

Figure 8:
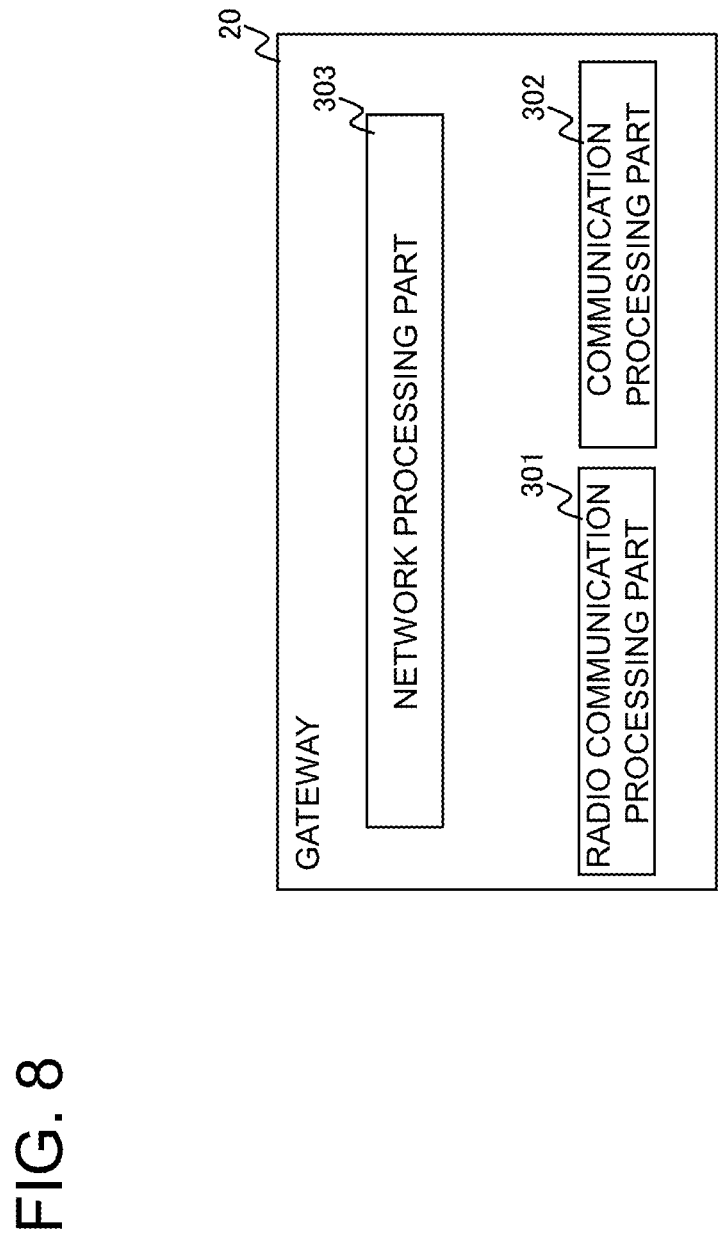
FIG. 8 is a diagram showing one example of a processing configuration of a gateway of the first exemplary embodiment.

FIG. 8 is a diagram showing one example of a processing configuration (processing module) of a gateway 20. Referring to FIG. 8, the gateway 20 is configured by comprising a radio communication processing part 301, a communication processing part 302 and a network processing part 303.

The radio communication processing part 301 controls radio communication with the terminals 10. The radio communication processing part 301 receives a data frame from the terminals 10 and transfers the received data frame to the network processing part 303. The radio communication processing part 301 generates an ACK frame(s) based on the ACK packet(s) obtained from the network processing part 303 and transmits it to the terminals 10.

The communication processing part 302 controls communication with the network server 30. The communication processing part 302 stores data from the network processing part 303 in a data packet and transmits it to the network server 30. The communication processing part 302 receives an ACK packet from the network server 30 and transfers it to the network processing part 303.

The network processing part 303 controls data transmission between the radio communication processing part 301 and the communication processing part 302.

Figure 9A:
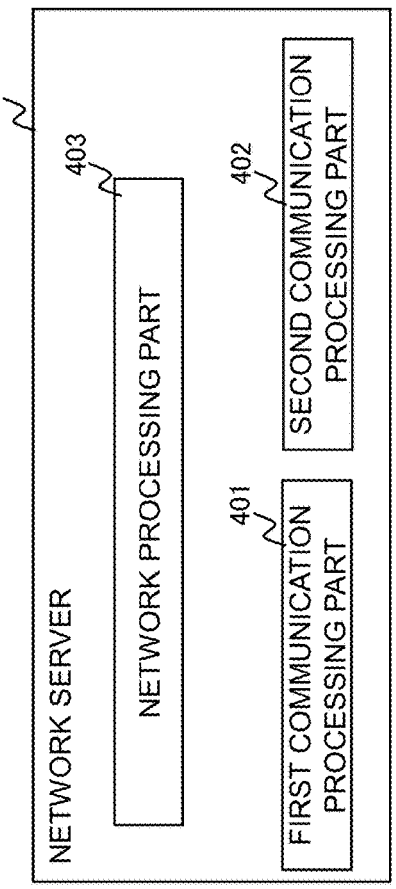
FIGS. 9A-9B are diagrams showing one example of a processing configuration of a network server of the first exemplary embodiment.
Figure 9B:
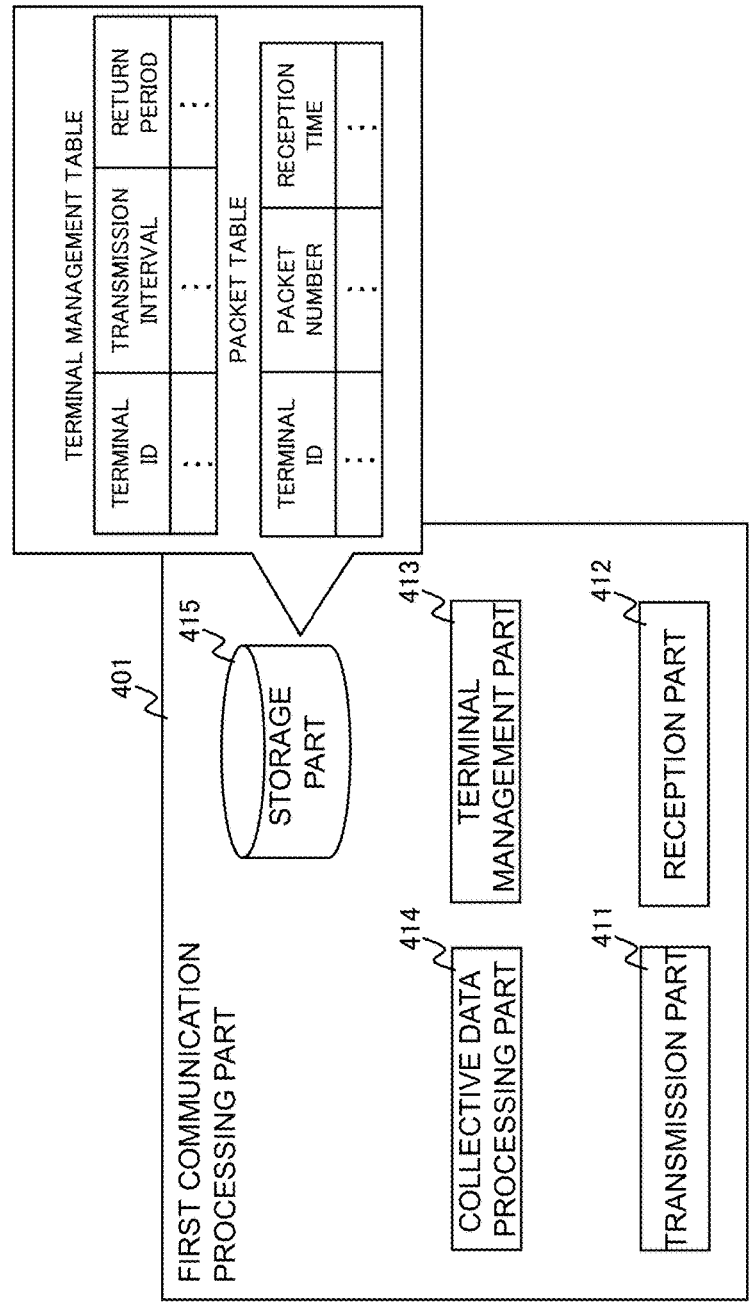

FIGS. 9A-9B are diagrams showing one example of a processing configuration (processing module) of a network server 30. Referring to FIG. 9A, the network server 30 is configured by comprising a first communication processing part 401, a second communication processing part 402 and a network processing part 403.

The first communication processing part 401 communicates with the gateway 20 using packets.

The second communication processing part 402 communicates with the application server 40 using packets.

The network processing part 403 controls data transmission between the first communication processing part 401 and the second communication processing part 402.

As illustrated in FIG. 9B, the first communication processing part 401 is configured by comprising a transmission part 411, a reception part 412, a terminal management part 413, a collective data processing part 414 and a storage part 415.

The storage part 415 stores a variety of tables (table information). The information stored in the storage part 415 includes detail information relating to the terminals 10 (a terminal management table) and information relating to received packets (packet table).

The terminal management table includes information relating to terminal ID of each terminal 10, data transmission interval of each terminal 10, return periods (RD1, RD2) of each terminal 10, and the like. Herein, the terminal ID and the transmission interval are previously input into the network server 30 by a system manager and the like. In addition, in a case where the network server 30 provides no instruction for the return periods (RD1, RD2) to the terminals 10, an initial value (a default value) is set in the field concerned.

The packet table stores detail information of a data packet obtained via the gateway 20. The packet table includes information relating to a terminal ID of a terminal which have transmitted a data packet (data frame), a packet number described in the data packet, the time at which the data packet is received, and the like.

The transmission part 411 transmits the data packet and the ACK packet.

The reception part 412 receives the data packet and the ACK packet.

Upon receiving the data packet from the gateway 20, the reception part 412 confirms the contents in the obtained data packet and updates the packet table in the storage part 415.

When the transmission part 411 has transmitted an ACK packet (including a collective ACK packet) corresponding to a data packet registered in the packet table, the transmission part 411 deletes an entry for the data packet from the packet table.

Herein, as stated later on, the collective ACK ID is calculated using the terminal ID and the packet number described in the packet table. The reception part 412 may calculates a collective ACK ID and store it in the table upon an entry is added into the packet table.

The terminal management part 413 controls the return periods (RD1, RD2) of each terminal 10 so that a plurality of terminals 10 open the reception slot at the same timing.

Herein, the transmission part 411 is so designed that it transmits an ACK packet to the gateway 20 at an arbitrary timing. The timing of transmission of ACK packet by the transmission part 411 may be set with an arbitrary time interval using a clock installed in the network server 30. Concretely, the transmission part 411 transmits ACK packets periodically (for example, every several seconds).

The terminal management part 413 determines the return periods (RD1, RD2) to be set in each terminal 10 so that each terminal 10 may receive the ACK packet transmitted periodically. The terminal management part 413 can prospect the timing of subsequent data transmission by the terminals 10 based on information relating to a data transmission interval and a reception time of a data packet by each terminal 10.

For example, it can be prospected that, if a data packet is received on "12:00:00" and the transmission interval is set for 10 minutes, a data packet would be transmitted at the timings, such as "12:10:00" or "12:20:00". The terminal management part 413 determines two return periods (RD1, RD2) so that the timing at which the terminal(s) 10 opens a reception slot for a data packet which would be transmitted in the feature is synchronized with the timing of transmission of the ACK packet.

Concretely, the terminal management part 413 defines the first return period (RD1) as a resultant value by subtracting the prospected data transmission time from the time of transmission timing which comes immediately after a prospected transmission time at which the terminal executes next data transmission. In addition, the terminal management part 413 defines the second return period as a resultant value by subtracting the prospected data transmission time from the time of next-next transmission timing which comes immediately after a prospected transmission time at which the terminal 10 executes next data transmission.

Figure 10:
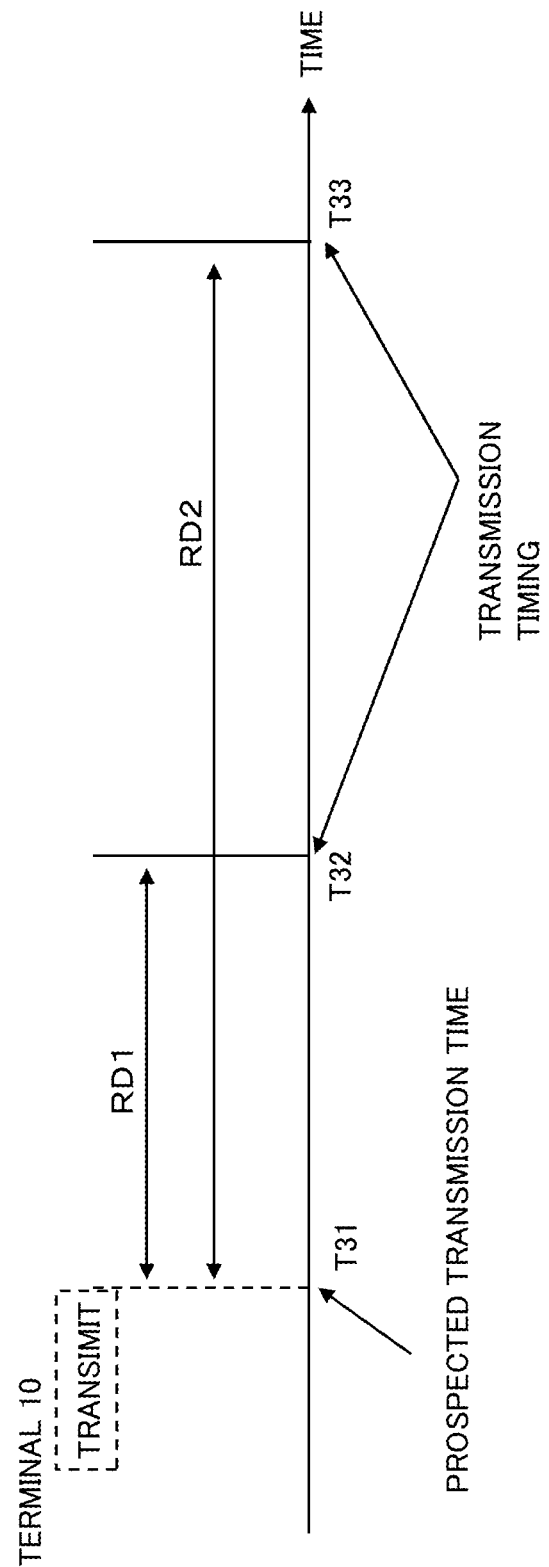
FIG. 10 is an explanatory view of actions by a network server of the first exemplary embodiment.

For example, referring to FIG. 10, the first return period (RD1) is defined as a difference (T32-T31) between a prospected transmission time T31 at which it is prospected that a terminal 10 executes transmission and a transmission time T32 which comes immediately after the prospected transmission time T31. Similarly, the second return period is defined as a difference (T33-T31) between a prospected transmission time T31 at which it is prospected that a terminal 10 executes transmission and a transmission time T33 which comes next to a timing immediately after the prospected transmission time T31.

The terminal management part 413 notifies the terminals 10 of the first and second return periods calculated in such manner. Herein, the terminal management part 413 adds the first and second return periods to the ACK data obtained from the application server 40 and notifies the terminals 10 of them via the gateway 20.

However, since a terminal 10, before reception of the communication concerned does not open the reception slot at a timing at which the transmission part 411 executes periodical transmission, the ACK packet including the ACK data is transmitted at a timing defined by a variety of Low Power Wide Area radio communication standards. Or, the terminal management part 413 may notify the terminal(s) 10 of the return periods using a control packet (an original command) which has been previously defined in agreement with the terminal(s) 10.

As described above, the terminal management part 413 determines the time at which each terminal 10 opens the reception slot based on data transmission interval of the terminals 10 in such manner. More concretely, the terminal management part 413 prospects the time at which the terminal 10 would make next data transmission based on the time at which the terminal 10 has made data transmission and the data transmission interval. After that, the terminal management part 413 determines the time at which the terminal 10 would open the reception slot based on the prospected transmission time and the scheduled transmission time for transmission of a collective ACK packet.

The collective data processing part 414 executes a processing for a collective ACK packet to be transmitted to the gateway 20. The collective data processing part 414 collects ACK packets from network processing part 403, which is addressed to a plurality of terminals 10, into one packet and transmit it to the gateway 20.

As described above, the collective data processing part 414 generates a data part in a collective ACK packet by combining ACK data addressed to each terminal 10. The collective data processing part 414 refers to the packet table in the storage part 415 and identifies a data packet corresponding to an ACK packet received from the application server 40. Concretely, the collective data processing part 414 searches an entry identical with the terminal ID included in the received ACK packet in the packet table so as to execute identification of the data packet.

Next, the collective data processing part 414 generates a collective ACK ID to be stored in the collective ACK packet using the terminal ID of the terminal 10 and the packet number of the identified data packet. For example, the collective data processing part 414 generates the collective ID identical with one terminal 10 by combining lower 3 bits in the terminal ID with lower 5 bits in the packet number.

Assume that the lower 3 bits in terminal ID is indicated by Hi and the packet number is indicated by Pi, the collective ID is represented by the following formula (1).

$$\text{collective}ID: a_i = \{H_i, P_i\} \qquad \text{[Formula 1]}$$

where, i is a positive integer, indicating a suffix for identification of a received data packet and $0 \leq i \leq n-1$, in a case where data packets of n numbers are received (n is a positive integer, the same is applied hereinafter).

FIG. 11 exemplifies a relationship between a terminal ID transmitted from each terminal 10, a packet number and a collective ID.

The collective data processing part 414 generates collective IDs (a0, a1, - - - , an−1) for all packets which have been received until a scheduled transmission time which comes next. In addition, the collective data processing part 414 calculates sum (logical sum) of the generated collective IDs and defines the resultant value as a collective ACK ID. The collective ACK ID is obtained by the following formula (2).

$$A = \sum_{i=0}^{n-1} a_i \qquad \text{[Formula 2]}$$

The collective data processing part 414 generates a collective ACK packet as illustrated in FIG. 6A. Herein, the above described generation of the collective ACK ID and the collective ACK packet is a mere example, the collective ACK packet may be generated by various methods. For example, bit width may be expanded for reducing error detection ratio upon data transmission confirmation. Or, a collective ACK packet may be generated using a bloom filter.

Figure 12:
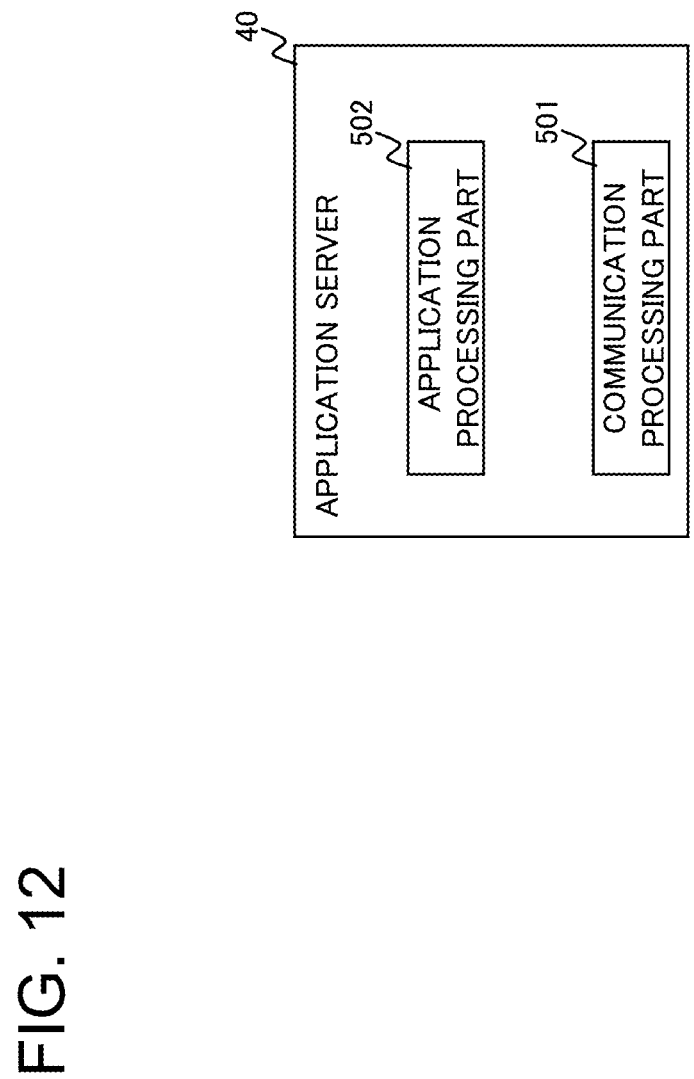
FIG. 12 is a diagram showing one example of a processing configuration of an application server of the first exemplary embodiment.

FIG. 12 is a diagram showing one example of a processing configuration (processing module) of an application server 40. Referring to FIG. 12, the application server 40 is configured by comprising a communication processing part 501 and an application processing part 502.

The communication processing part 501 executes data communication with the network server 30.

The application processing part 502 executes packet communication with the network server 30. In addition, the application processing part 502 receives data from the communication processing part 501 and executes aggregation processing etc. for the data. After that, the application processing part 502 returns an ACK packet to the terminals 10 for confirmation of data reception.

Next, a hardware configuration of each apparatus will be explained.

[Hardware Configuration of Network Server]

Figure 13:
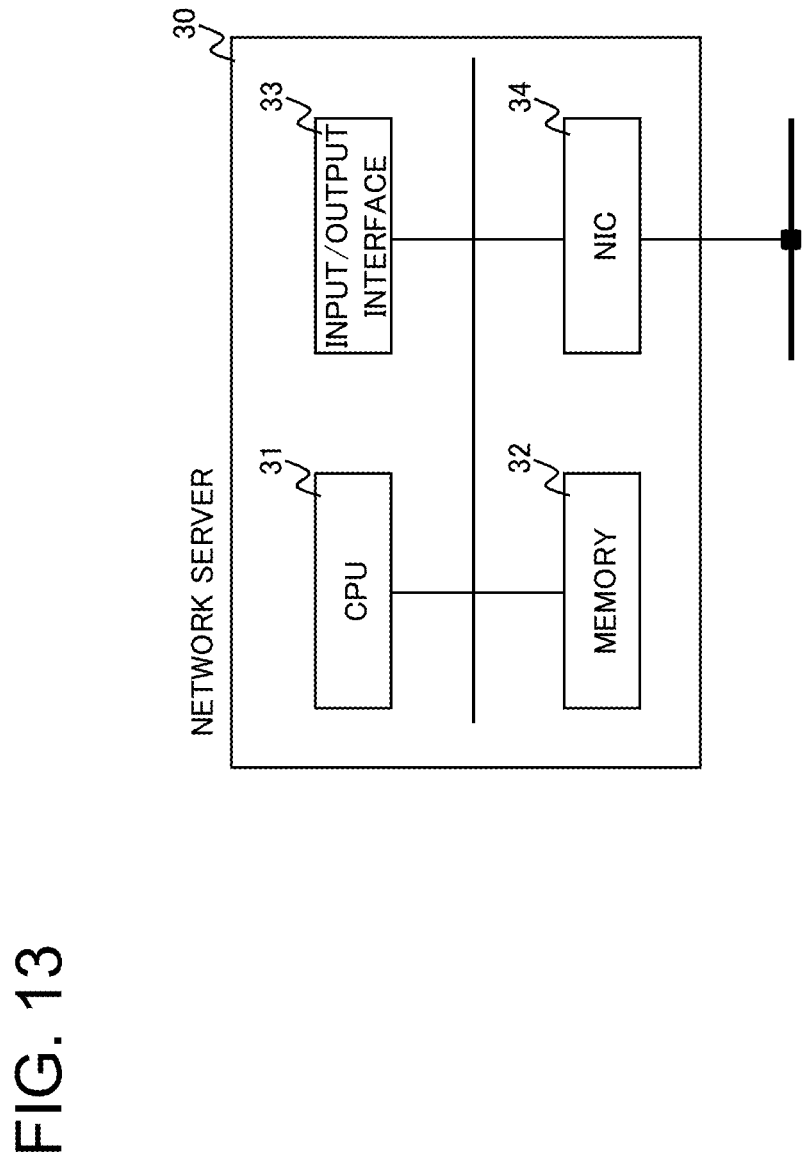
FIG. 13 is a diagram showing one example of a hardware configuration of a network server of the first exemplary embodiment.

FIG. 13 is a diagram showing one example of a hardware configuration of a network server 30 of the first exemplary embodiment. The network server 30 has a configuration exemplified in FIG. 13. For example, the network server 30 comprises a CPU (Central Processing Unit) 31, a memory 32, an input/output interface 33, NIC (Network Interface Card) 34 as a communication interface, and the like, which are mutually connected with an internal bus.

Herein, it is intended that the configuration illustrated in FIG. 13 provides no limitation in the hardware configuration of the network server 30. The network server 30 may include a hardware which is not shown. It is also intended that the number of CPU etc. included in the network server 30 is not limited to the example of FIG. 13, for example, a plurality of CPUs 31 may be included in the network server 30.

The memory 32 is RAM (Random Access Memory), ROM (Read Only Memory), auxiliary storage apparatus (such as a hard disk) and the like.

The input/output interface 33 is an interface of an input/output apparatus which is not shown. The input/output apparatus includes, for example, a display apparatus, an operation device etc. The display apparatus is, for example, a liquid crystal display and the like. The operation device is, for example, a keyboard, a mouse etc.

The function of the network server 30 is realized by the processing module described above. The processing modules are realized, for example, by execution of program stored in the memory 32 by the CPU 31. In addition, the program may be downloaded via a network or updated using a storage medium storing a program. Further, the processing module may be realized with a semiconductor chip. That is, a function exerted by the processing modules may be realized by any hardware or by software executed using the hardware.

[Hardware Configuration of Terminal]

Figure 14:
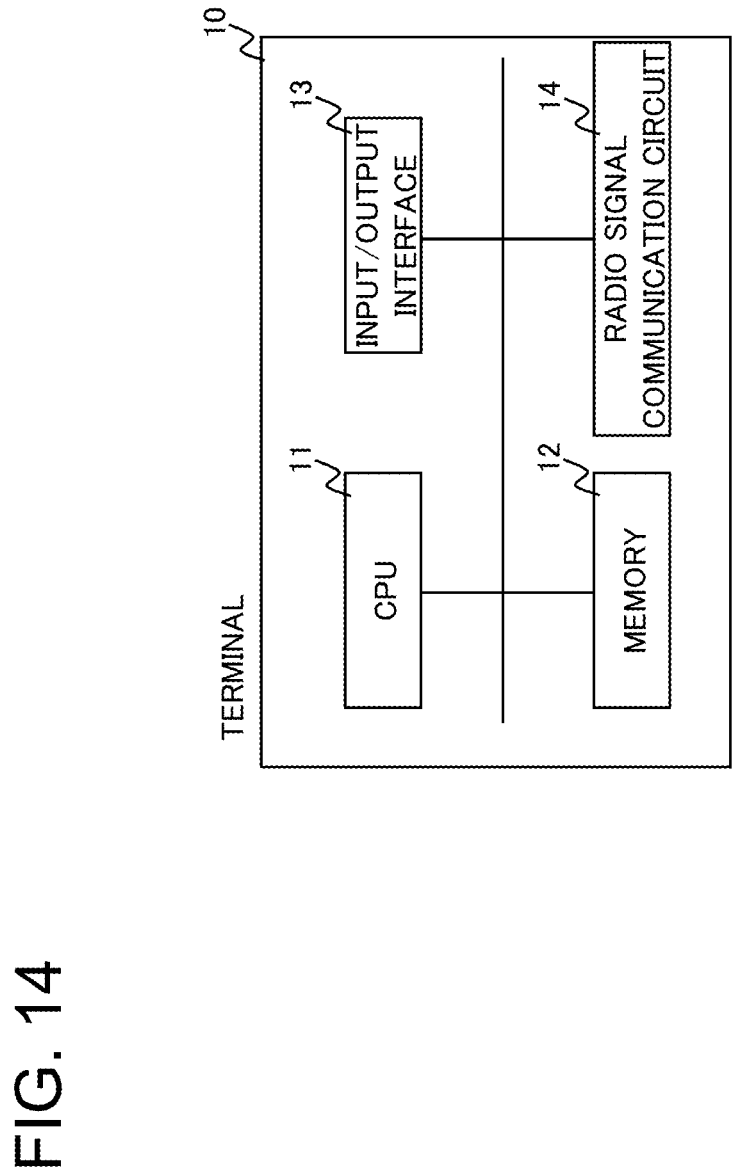
FIG. 14 is a diagram showing one example of a hardware configuration of a terminal of the first exemplary embodiment

FIG. 14 is a diagram showing one example of hardware configuration of a terminal 10 of the first exemplary embodiment. As illustrated in FIG. 14, the terminal 10 comprises a radio signal communication circuit 14. The radio signal communication circuit 14 is connected to an antenna (not shown) and realizes radio communication with the gateway 20.

Herein, explanation for CPU11, memory 12 and input/output interface 13 is omitted, since they may be the same with the contents explained with reference to FIG. 13. The function of the terminal 10 is realized by execution of a program stored in the memory 12 by CPU 11.

Hardware configurations of the gateway 20 and the application server 40 may be the same as those of the network server 30, terminal 10 and the like, thus explanation thereof is omitted since it would be apparent for a person skilled in the art.

Next, actions by the communication system of the first exemplary embodiment will be explained. Herein, actions by the terminal 10 and the network server 30 will be explained mainly.

Figure 15:
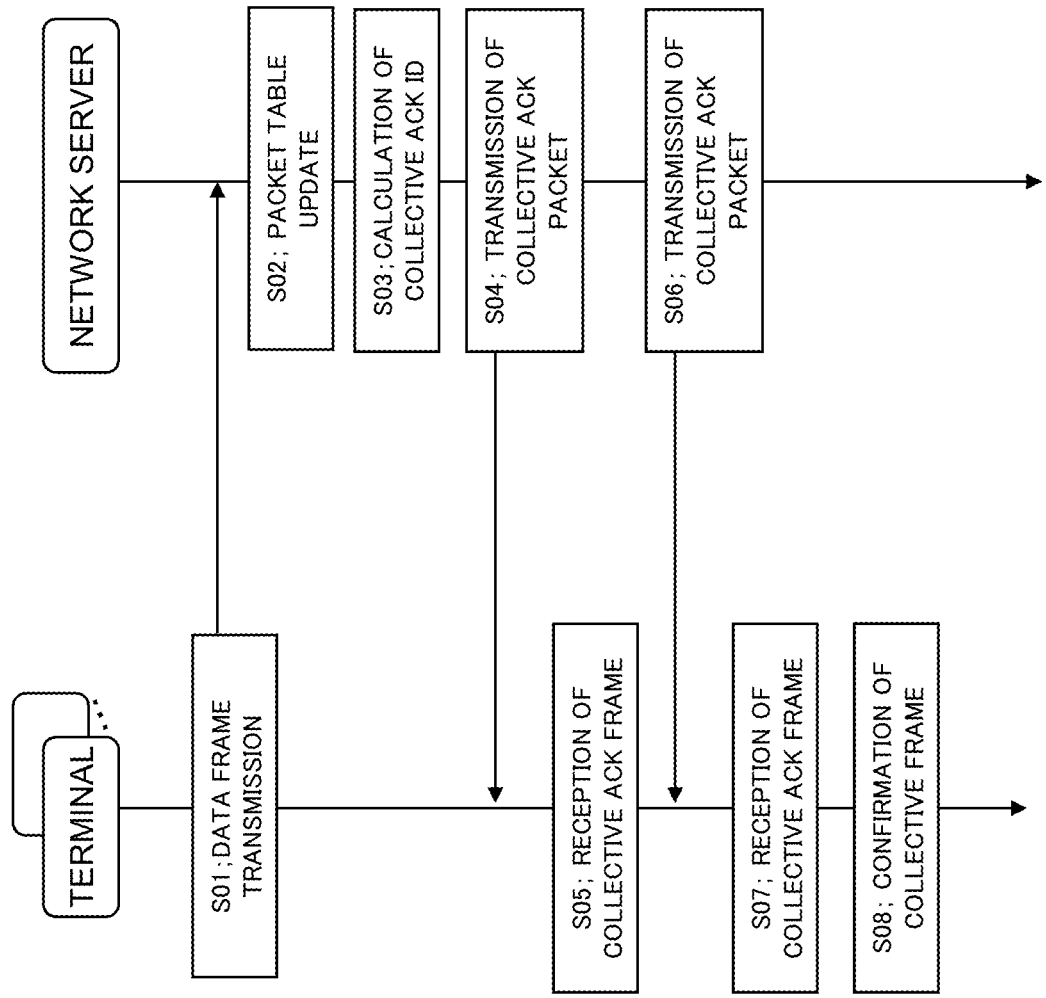
FIG. 15 is a sequence diagram showing one example of actions by a communication system of the first exemplary embodiment.

FIG. 15 is a sequence diagram showing one example of actions by a communication system of the first exemplary embodiment. Herein, the actions illustrated in FIG. 15 are under a state where the network server 30 has no ACK packet waiting for transmission. In addition, the actions illustrated in FIG. 15 are in a case where notification of return periods (RD1, RD2) to each terminal 10 has been completed, and then a packet is currently received under such situation.

In step S01, the terminals 10 transmit data frames. Herein, it is assumed that the terminals 10 transmitted packets of n number. The terminal 10 which has transmitted the data frame shifts to an idle mode.

The network server 30 receives the data packet and updates the packet table (step S02). At that time, the network server 30 may calculate the collective ID (a0, a1, ..., an−1) of each packet and store it in the storage part 415.

In step S03, when the predetermined transmission time (scheduled transmission time) comes, the network server 30 calculates the collective ACK ID from the collective ID of each packet.

In step S04, the network server 30 generates a collective ACK packet including the calculated collective ACK ID and transmits it to the terminals 10 via the gateway 20.

At the timing of step S04, each terminal 10 returns from the idle mode and waits arrival of the collective ACK frame (opens first reception slot; step S05).

In step S06, the network server 30 transmits the collective ACK packet at the next transmission timing.

The terminal 10 which has received no ACK frame in step S05 shifts to the idle mode and then returns from the idle mode at the timing of step S06 so as to wait arrival of the collective ACK frame (opens second reception slot; step S07).

In a case where the terminal 10 has received the collective packet in step S05 or step S07, the terminal 10 determines whether or not the collective ACK frame includes ACK addressed to own apparatus (confirmation of collective frame; step S08).

The frame processing part 213 of the terminal 10 calculates a logical conjunction C of the collective ACK ID included in the collective ACK packet and an collective ID generated from the terminal ID and the packet number set in the data frame which has been transmitted by itself (see the following formula (3)).

$$C = A \wedge a_m \qquad \text{[Formula 3]}$$

In the formula (3), A is the collective ACK ID and $a_m$ (m is a positive integer, the same is applied hereinafter) is a collective ID generated by the terminal 10.

In a case where the logical conjunction C obtained from the formula (3) and the collective ID $a_m$ calculated from the packet number and the terminal ID transmitted from own apparatus are identical, the frame processing part 213 determines that the collective ACK frame including the collective ACK ID is the ACK addressed to own apparatus (that the collective ACK frame includes ACK addressed to the own apparatus). That is, in such case, the frame processing part 213 determines that the data frame which has been transmitted is normally received by the network server 30 and application server 40.

On the other hand, the collective ACK ID and the calculated collective ID $a_m$ are not identical, the frame processing part 213 determines that the ACK frame is not addressed to own apparatus and discards the collective ACK frame.

As stated above, the collective ACK packet (collective acknowledgement) includes information (collective ACK ID) with which destination of stored data can be determined. In addition, the collective ACK ID is generated from the terminal ID and the packet number and the collective ID composed of own apparatus terminal ID and packet number can be extracted by execution of the formula (3). That is, the collective ACK packet includes information from which destination of stored data (terminal ID) and data number for identifying transmitted data (packet number) can be extracted.

In a case where the terminal 10 cannot receive any collective ACK frames addressed to own apparatus with two reception slots, the terminal 10 determines that the preceding data frame has not been normally received by application server 40 etc. In such case, the terminal 10 executes a countermeasure, such as adding lost data (sensor data) to a frame data to be transmitted at a next timing or the like.

As stated above, in the first exemplary embodiment, when the application server 40 returns an acknowledgement indicating reception of data (ACK packet) as a response to data frame transmitted by the terminal 10, the timing of the reception waiting mode in the terminal 10 is adjusted. More concretely, the network server 30 controls each terminal 10 so that a plurality of terminals 10 open the reception slots at a synchronized timing.

Further, the network server 30 collects ACK packet destined to each terminal 10 and transmits the collected collective ACK packet to the terminals 10 via the gateway 20 within the reception slot opened by each terminal 10 at the same time. Each terminal 10 receives the collected collective ACK frame from the gateway 20 and extracts ACK addressed to own apparatus. If the terminal 10 can extract ACK addressed to own apparatus, the terminal 10 determines that the preceding data (precedently transmitted data) is normally received by the application server 40.

Accordingly, in first exemplary embodiment, since the collective ACK frame is transmitted from the gateway 20 to the terminal 10, the total volume of frames to be transmitted from the gateway 20 to the terminal 10 is reduced. In addition, since each terminal 10 can determine arrival of the data frame to the application server 40, each terminal 10 can determine the necessity of retransmission, thus high reliance on communication is achieved.

As stated above, a collection scheme of frames for radio communication has been proposed, in which, for example, in a frame aggregation scheme in Wi-Fi (Wireless Fidelity), a plurality of frames are collected in a Wi-Fi access point and transmitted as one frame to a terminal therefrom. However, such scheme may be applied a transmission from a radio gateway to only one terminal. In addition, there is a communication scheme in which data is simultaneously distributed to a plurality of terminals by a multicast communication or a broadcast communication. However, under Low Power Wide Area radio communication, the terminals wait reception of a frame within a severely limited time period, thus there are a large number of cases where simultaneous distribution technology cannot be applied. Further, since it is required to respectively return different contents for return transmission of acknowledgements, neither of the broadcast communication nor multicast communication can be applied. In the communication system of the first exemplary embodiment, since a plurality of terminals 10 simultaneously open reception slots and a frame (packet) in which ACK for each terminal 10 is collected is transmitted, a problem relating to the Low Power Wide Area radio communication can be solved.

SECOND EXEMPLARY EMBODIMENT

Next, a second exemplary embodiment will be explained in detail with drawings.

In the second exemplary embodiment, it is explained a case where each terminal 10 is assigned to groups for collection of acknowledgements (ACK), in place of the collective ACK ID explained in the first exemplary embodiment.

In the second exemplary embodiment, a plurality of terminals 10 are divided into virtual groups, such as virtual network groups and multicast groups. Concretely, terminals 10-1 to 10-4 are divided into groups in a manner shown in FIG. 16. In FIG. 16, symbol ○ represents that a terminal belongs to respective group, and symbol x represents that a terminal does not belong to respective group.

The collective data processing part 414 transmits a collective ACK packet to groups which are determined based on combination of the terminals 10 to be transmission destinations of the collective ACK packet. More concretely, the collective data processing part 414 selects groups based on combinations of terminals 10 to which ACK packet is to be transmitted and transmits the ACK packet including group ID assigned to each group. For example, referring to FIG. 16, in a case where ACK packets to a terminal 10-3 and a terminal 10-4 are transmitted at the same transmission timing, group 1 (G1) is selected and the group ID of the group 1 is set in the ACK packets.

Each terminal 10 holds information relating group ID of a group to which own apparatus belongs and determines whether or not a data frame has been normally received based on whether or not an ACK frame includes the group ID of the group to which own apparatus belongs. That is, the radio communication processing part 202 of the terminal 10 has a function for identifying a virtual network group or a multicast group. In addition, the application processing part 201 of the terminal 10 has a function for specifying data which has arrived at the application server 40 or the network server 30 based on the received ACK.

Accordingly, in the second exemplary embodiment, the network server selects a group based on combination of terminals 10 to be transmission destinations of acknowledgements (ACK) and transmit the ACK to the determined group. As a result, determination process for acknowledgement by the terminal 10 may be simplified and a communication where collection of the acknowledgements (ACK) is achieved may be realized even in such simplified process.

Modified Examples

Configuration and actions of the communication systems explained in the above exemplary embodiments are mere examples, thus various modification may be applied thereto. For example, the functions of the application server 40 may be realized by the network server 30 jointly.

Figure 17:
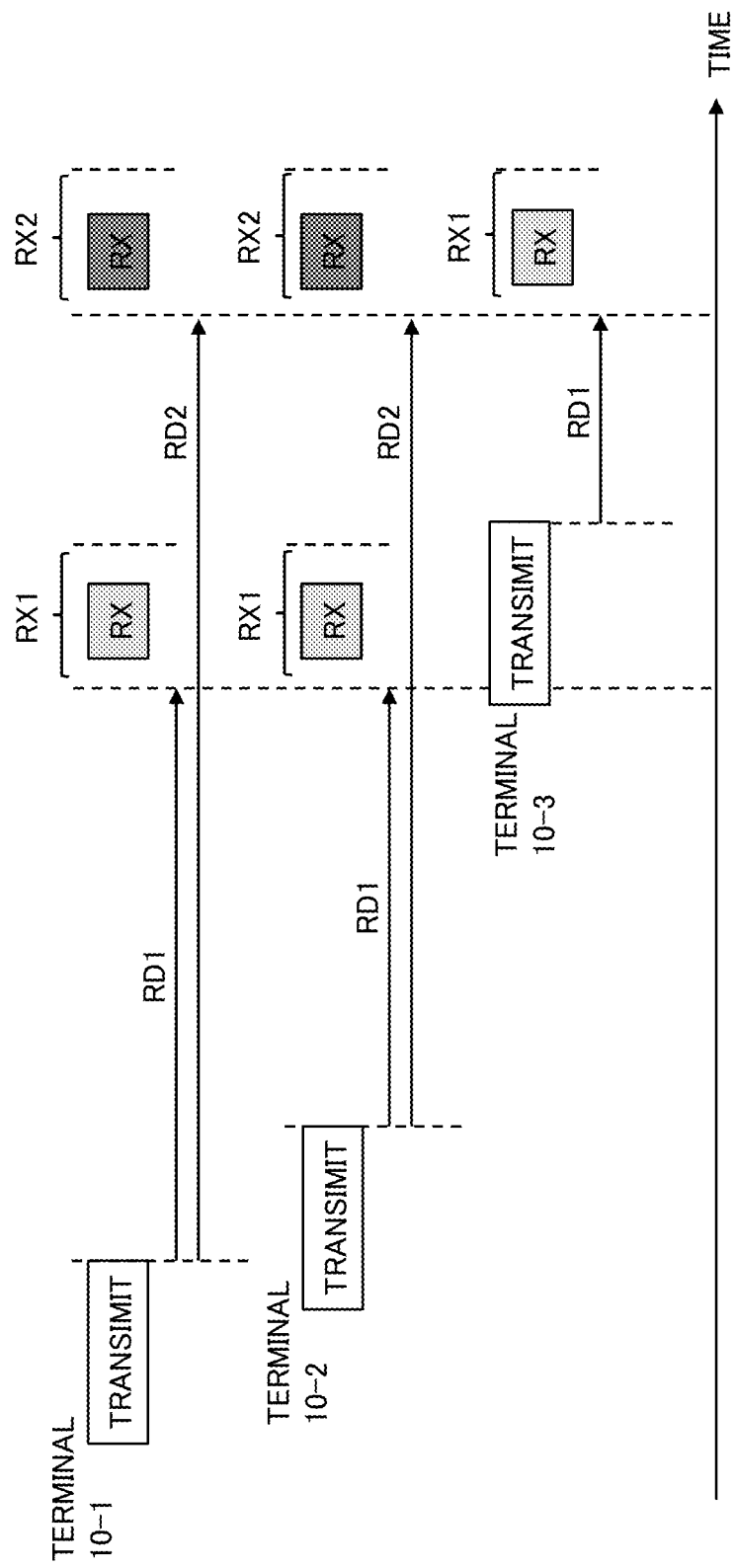
FIG. 17 is a diagram showing one example of data communication by a terminal.

Furthermore, although a case is explained in FIG. 5, where the first reception slot (RX1) and the second reception slot (RX2) are synchronized in each terminal 10, the reception slot of each terminal 10 may coexist at each transmission timing (see FIG. 17). That is, the reception slots (RX1, RX2) may be accumulatedly set at one timing.

The network server 30 may execute control for one reception slot in response to a plurality of data packets. Concretely, the network server 30 may instruct the terminals to return from idle mode by instructing either one of two return periods (RD1, RD2).

Figure 18:
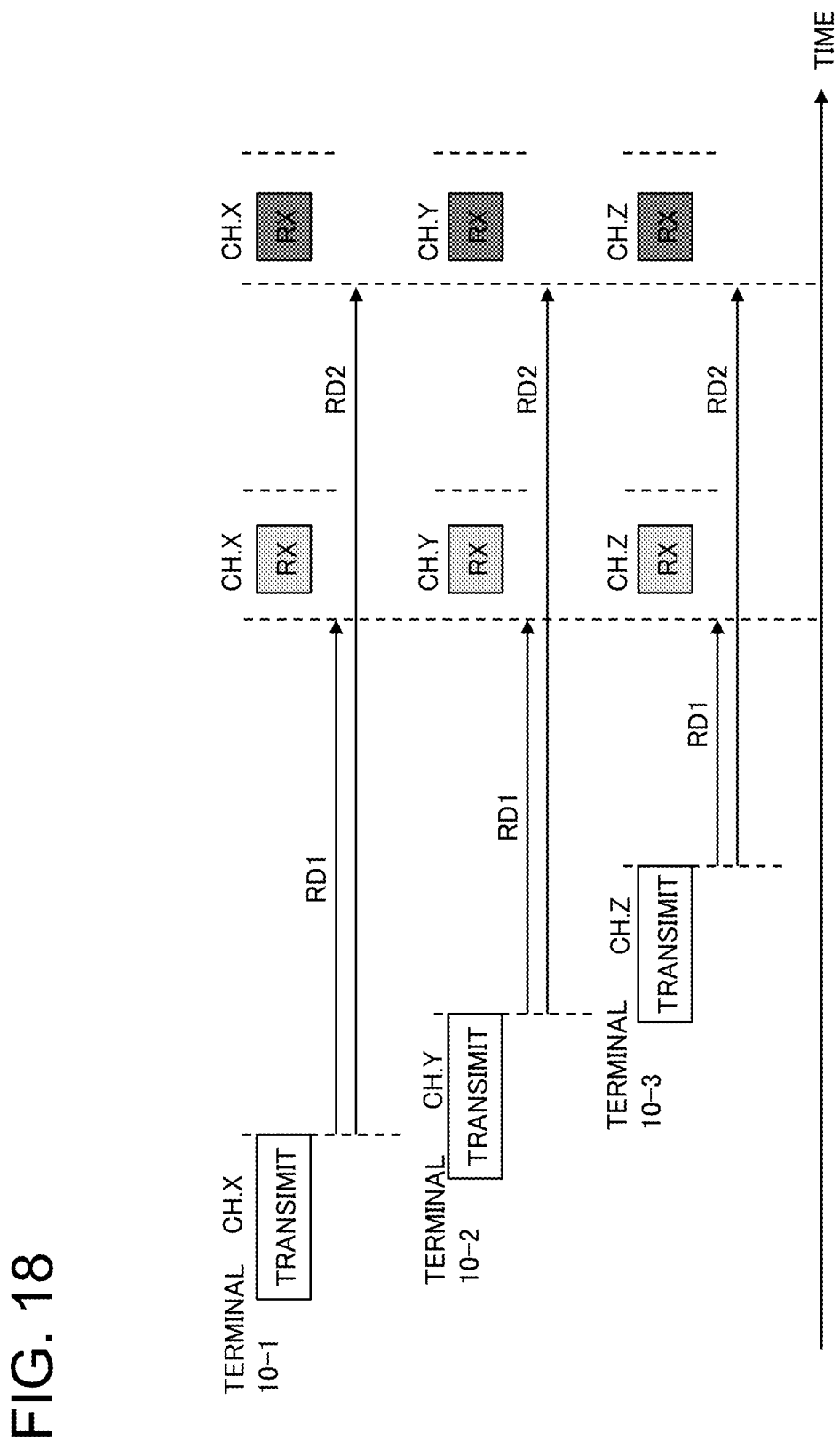
FIG. 18 is a diagram showing one example of data communication by a terminal.

The reception slots may be compatible to data transmissions where several channels are used (see FIG. 18). Herein, in FIG. 18, channels (CH) are indicated at a position above data transmission (Transmit) or acknowledgement (RX).

Figure 19:
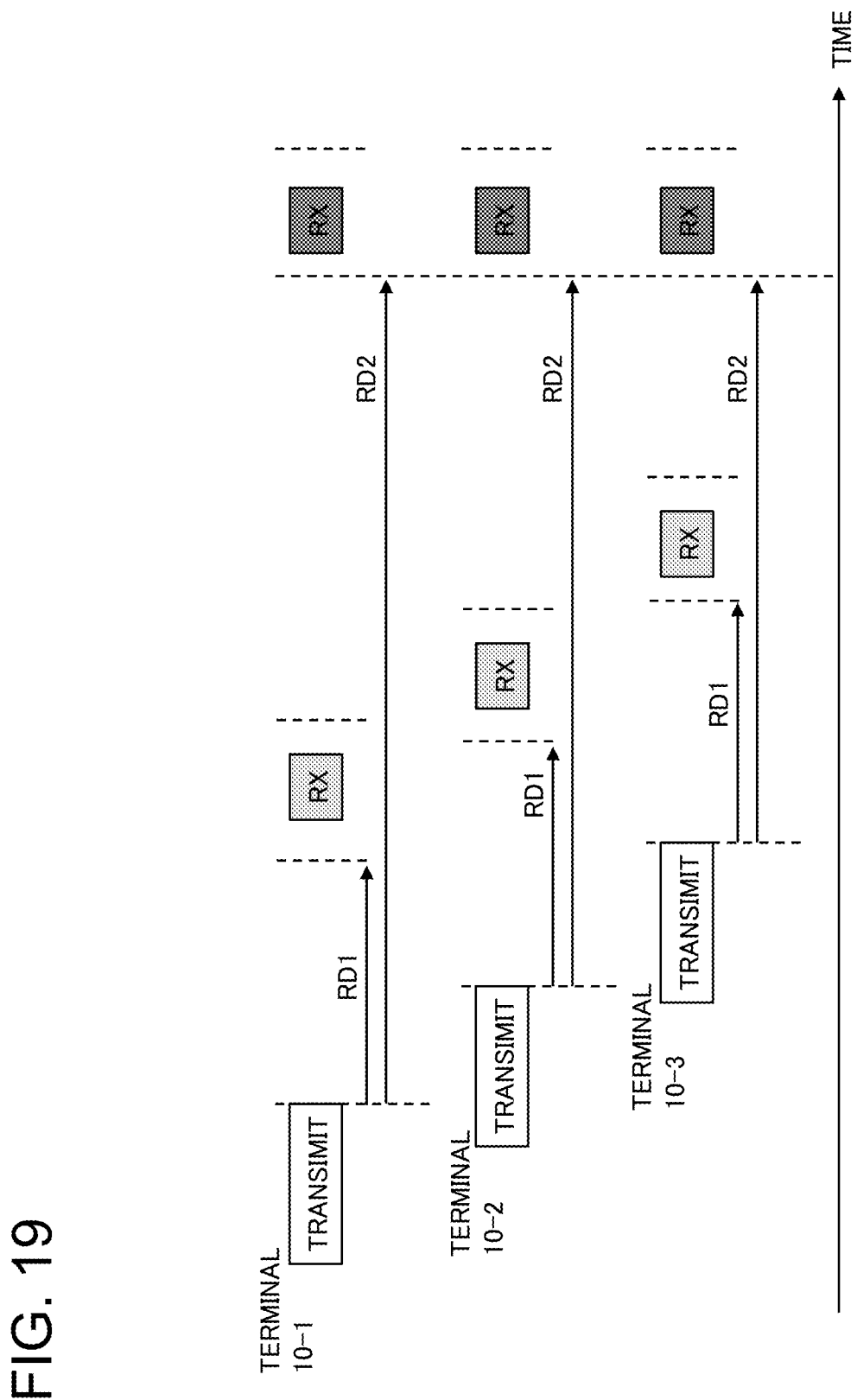
FIG. 19 is a diagram showing one example of data communication by a terminal.

In a case of communication where data is transmitted from the network server 30 to the terminal 10 in a manner stored (included) in an acknowledgement (ACK), as illustrated in FIG. 19, it may be also exemplified that the first acknowledgements (ACK) which store data are not collected, while second acknowledgements (ACK) are collected.

Although control of the gateway 20 by the network server 30 is not explained in the above exemplary embodiments, if necessary, the network server 30 may transmit control packets to the gateway so as to control actions thereby. For example, the network server 30 may instruct the gateway 20 to execute frame transmission at a transmission power with which a frame may reach all terminals 10 to be destinations of the collective ACK frame. In such case, the network server 30 may instruct the gateway 20 so as to execute transmission of the collective ACK frame at the maximum output power.

The network server 30 generates the collective ACK packet under consideration of the capacity number of acknowledgement transmission by the gateway in a case where the transmission number of the acknowledgement (ACK) is predicted to exceed the allowable (capacity) number. For example, in a case where one gateway 20 has a capacity of accommodating "4" terminals and 3 terminals are connected to the gateway, the network server 30 may generate the collective ACK packet. Accordingly, the network server 30 may determine whether it generates the collective ACK packet or not based on the allowed number of terminals to be accommodated in the gateway.

Although a case is explained in the above exemplary embodiments, where one collective ACK packet includes ACK data destined to each of terminals 10, the collective ACK packet may include one ACK data if the ACK data destined to each terminal 10 have no difference.

The network server 30 may compress a plurality of ACK data to each terminal 10 and stores it in the collective ACK frame. Alternatively, the network server 30 may add information to the collective ACK packet for indicating the destination address of the stored ACK data, or may add instruction for disregarding the stored ACK data. That is, the network server 30 may add instruction to the collective ACK packet so that the data stored in the collective ACK packet should not be used by the terminals 10.

Problems to be solved by the present disclosure and solution methods and effect thereof are summarized as follows.

It is a first problem that, since the terminals 10 has a restricted reception time period, there is a case where the terminals 10 are not able to receive transmission of collective ACK collected for a plurality of terminals 10 from a gateway (radio gateway) 20 to the plurality of terminals 10. In order to solve this problem, in the present disclosure, the plurality of terminals 10 are synchronized for the time to shift to their reception waiting mode so that the terminals 10 receive acknowledgement from the gateway 20. As a result, even in a case where the terminals 10 have restricted reception time period, the terminals may receive the collective ACK transmitted from the gateway 20 to the plurality of terminals 10.

It is a second problem that the gateway 20 may not transmit the collective ACK at the time during the plurality of terminals 10 shift to the reception waiting mode. In order to solve this problem, in the present disclosure, a plurality of ACK information addressed to the plurality of terminals 10 are collected and the gateway 20 transmits it to the terminals 10 at the time during which the plurality of terminals 10 are waiting its arrival. As a result, the gateway 20 can transmit the collective ACK during the time at which the plurality of terminals 10 shift to the reception waiting mode.

It is a third problem that, due to irrelevant transmission power for ACK transmitted by the gateway 20 to the plurality of terminals 10, the terminals 10 are unable to receive ACK in a case of too low transmission power. In order to solve this problem, in the present disclosure, the gateway 20 transmits the collective ACK at a transmission power level capable of reaching all terminals 10 to be destination of the collective ACK. As a result, the transmission power level of the ACK transmitted by the gateway 20 to the plurality of terminals 10 is pertinently set, thus all terminals 10 may receive ACK.

It is a fourth problem that, it is impossible to prospect that transmission number from the gateway 20 (connection number of the terminals 10) will exceed an allowed transmission number in the near feature. In order to solve this problem, the allowed transmission number of the gateway 20 is taken into consideration, and in a case where it is prospected that it will reach the allowable number, it is determined to collect the ACK. As a result, it may be prospected whether there is a risk where the transmission number from the gateway 20 will exceed the allowed transmission number in the near feature.

It is a fifth problem that, the terminals 10 cannot know to which transmitted data (source data) the acknowledge relates as to a collective ACK. In order to solve this problem, in the present disclosure, the collective ACK includes data for identifying destination. As a result, the terminal 10 may determine the source data of the received collective ACK.

It is a sixth problem that, the terminals 10 cannot determine whether unnecessary information is included in the collective ACK entirely or partially. In order to solve this problem, in the present disclosure, the transmission includes an instruction to disregard data stored in the collective ACK. As a result, the terminals 10 may determine whether or not the collective ACK includes unnecessary information entirely or partially.

It is a seventh problem that, there is a case where it is actually difficult to install ACK collective function into all terminals 10. In order to solve this problem, in the present disclosure, the terminals 10 are divided into groups and a group is selected based on combination of transmission destination of the collective ACK. As a result, ACK collective function may be realized using group communication function actually equipped by a large number of terminals.

A part or entire of the above exemplary embodiments may be described as follows, but not limited thereto.

[MODE 1]

A server of the first aspect described above.

[MODE 2]

The server according to MODE 1, wherein the server is configured to: transmit the collective (or comprehensive) acknowledgement to the first and second terminals via a gateway that provides radio connection to the plurality of terminals; and instruct the gateway to output the collective acknowledgement at a transmission power level capable of reaching the first and second terminals.

[MODE 3]

The server according to MODE 2, wherein the server is configured to: determine whether or not the collective acknowledgement is generated based on an allowed number of terminals to be accommodated in the gateway.

[MODE 4]

The server according to any one of MODEs 1 to 3, wherein the collective acknowledgement includes information with which destination of stored data can be determined.

[MODE 5]

The server according to any one of MODEs 1 to 4, wherein the collective acknowledgement includes information from which destination of stored data and data number for identifying transmitted data can be extracted.

[MODE 6]

The server according to any one of MODEs 1 to 5, wherein the collective acknowledgement includes an instruction by which the first and second terminals do not use data stored therein.

[MODE 7]

The server according to any one of MODEs 1 to 3, wherein the plurality of terminals has been classified into groups;

the server is configured to transmit the collective acknowledgement to a group determined based on a combination of terminals which are to be transmission destination(s) of the collective acknowledgement.

[MODE 8]

The server according to any one of MODEs 1 to 7, wherein the plurality of terminals respectively open two reception slots as a response to one data transmission, the first and second terminals are controlled so as to simultaneously open each of the two reception slots at substantially the same timing.

[MODE 9]

The server according to any one of MODEs 1 to 8, wherein the server determines opening time of the reception slot for each of the first and second terminals based on data transmission interval of the first and second terminals.

[MODE 10]

The server according to MODE 9, wherein the server is configured to prospect the time of next data transmission by the first and second terminals based on the time at which the first and second terminals have transmitted data and the data transmission interval, and determine the opening time of reception slot by the first and second terminals based on the prospected transmission time and a scheduled transmission time for transmission of the collective acknowledgement.

[MODE 11]

A communication system of the second aspect described above.

[MODE 12]

A communication method of the third aspect described above.

[MODE 13]

A program of the fourth aspect described above.

Herein, MODEs 11 to 13 may be developed similarly to MODE 1 into MODE 2 to MODE 10.

Disclosure of the Patent Literatures above is incorporated in the present application by reference thereto. The exemplary embodiments or examples may be modified or adjusted within the scope of the entire disclosure of the present invention, inclusive of claims, based on the fundamental technical concept of the invention. In addition, a variety of combinations or selection (including non-selection) of elements disclosed herein, inclusive each element in each claim, each element in each exemplary embodiment or example, each element in each drawing etc., may be made within the context of entire disclosure of the present inventions. That is, the present invention may cover a wide variety of modifications or corrections that may be made by those skilled in the art in accordance with the entire disclosure of the present invention, inclusive of claims, and the technical concept of the present invention. Particularly, it should be interpreted that, with respect to numerical value and range described in the present disclosure, arbitrary numerical values or small range within the range would be concretely described even in a case of no specific description.

REFERENCE SIGNS LIST

10, 10-1 to 10-4 terminal
11, 31 CPU (Central Processing Unit)
12, 32 memory
13, 33 input/output interface
14 radio signal communication circuit
20, 20-1, 20-2 gateway
30 network server
34 NIC (Network Interface Card)
40, 40-1, 40-2 application server
100 server
201, 502 application processing part
202, 301 radio communication processing part
211, 411 transmission part
212, 412 reception part
213 frame processing part
302, 501 communication processing part
303, 403 network processing part
401 first communication processing part
402 second communication processing part
413 terminal management part
414 collective data processing part
415 storage part

The invention claimed is:

1. A server comprising:

a processor; and a memory in circuit communication with the processor, wherein the processor is configured to:

transmit a first acknowledgement (ACK) to a first terminal in response to first data transmitted from the first terminal, the first ACK including a first instruction indicating a synchronized timing of opening a first reception slot after a first subsequent data transmission by the first terminal;

transmit a second ACK to a second terminal in response to second data transmitted from the second terminal, the second ACK including a second instruction indicating the synchronized timing of opening a second reception slot after a second subsequent data transmission by the second terminal; and transmit, at the synchronized timing, a collective acknowledgement (collective ACK) shared by a plurality of destination terminals in response to data transmission from the plurality of destination terminals, wherein the plurality of destination terminals comprises the first terminal and the second terminal and the data transmission comprises the first subsequent data transmission and the second subsequent data transmission, wherein the collective ACK includes a collective ACKID by which the plurality of destination terminals among the plurality of terminals can be determined, and wherein the collective ACKID is generated based on terminal IDs of the plurality of destination terminals.

2. The server according to claim 1, wherein the processor is configured to transmit the collective ACK periodically.

3. The server according to claim 1, wherein the plurality of terminals are configured to transmit data periodically.

4. The server according to claim 1, wherein the processor is further configured to:
   transmit the collective ACK to the plurality of destination terminals via a gateway that provides radio connection to the plurality of terminals, and
   instruct the gateway to output the collective ACK at a transmission power level capable of reaching the plurality of terminals.

5. The server according to claim 4, wherein the processor is further configured to determine whether or not the collective ACK is generated based on an allowed number of terminals to be accommodated in the gateway.

6. The server according to claim 4, wherein the collective ACK includes an instruction such that data stored in the collective ACK is not used.

7. The server according to claim 1, wherein
   the plurality terminals have been classified into groups;
   the processor is further configured to transmit the collective ACK to a group determined based on a combination of terminals which are to be transmission destination(s) of the collective ACK.

8. A communication system comprising plural terminals and a server, wherein the server is configured according to claim 1.

9. A communication method, wherein a processor of server is configured to execute:
   transmitting a first acknowledgement (ACK) to a first terminal in response to first data transmitted from the first terminal, the first ACK including a first instruction indicating a synchronized timing of opening a first reception slot after a first subsequent data transmission by the first terminal;
   transmitting a second ACK to a second terminal in response to second data transmitted from the second terminal, the second ACK including a second instruction indicating the synchronized timing of opening a second reception slot after a second subsequent data transmission by the second terminal; and
   transmitting, at the synchronized timing, a collective acknowledgement (collective ACK) shared by a plurality of destination terminals in response to data transmission from the plurality of destination terminals, wherein the plurality of destination terminals comprises the first terminal and the second terminal and the data transmission comprises the first subsequent data transmission and the second subsequent data transmission,
   wherein the collective acknowledgement includes a collective ACKID by which the plurality of destination terminals among the plurality of terminals can be determined, and
   wherein the collective ACKID is generated based on terminal IDs of the plurality of destination terminals.

10. A non-transient computer-readable storage medium storing a program which causes a computer installed in a server to execute:
    transmitting a first acknowledgement (ACK) to a first terminal in response to first data transmitted from the first terminal, the first ACK including a first instruction indicating a synchronized timing of opening a first reception slot after a first subsequent data transmission by the first terminal;
    transmitting a second ACK to a second terminal in response to second data transmitted from the second terminal, the second ACK including a second instruction indicating the synchronized timing of opening a second reception slot after a second subsequent data transmission by the second terminal; and
    transmitting, at the synchronized timing, a collective acknowledgement (collective ACK) shared by a plurality of destination terminals in response to data transmission from the plurality of destination terminals, wherein the plurality of destination terminals comprises the first terminal and the second terminal and the data transmission comprises the first subsequent data transmission and the second subsequent data transmission,
    wherein the collective acknowledgement includes a collective ACKID by which the plurality of destination terminals among the plurality of terminals can be determined, and
    wherein the collective ACKID is generated based on terminal IDs of the plurality of destination terminals.

* * * * *